US012644332B2

(12) United States Patent
Boek et al.

(10) Patent No.: US 12,644,332 B2
(45) Date of Patent: Jun. 2, 2026

(54) GATE APPARATUS AND METHOD

(71) Applicant: Crusader Fence Company LLC, Rancho Cordova, CA (US)

(72) Inventors: Martin Nathanael Boek, Orangevale, CA (US); Peter Kennedy, Auburn, CA (US); Michael Post, Roseville, CA (US); Brayton Statham, Roseville, CA (US)

(73) Assignee: Crusader Fence Company LLC, Rancho Cordova, CA (US)

( * ) Notice: Subject to any disclaimer, the term of this patent is extended or adjusted under 35 U.S.C. 154(b) by 256 days.

(21) Appl. No.: 18/327,547

(22) Filed: Jun. 1, 2023

(65) Prior Publication Data

US 2023/0392436 A1 Dec. 7, 2023

Related U.S. Application Data

(60) Provisional application No. 63/348,140, filed on Jun. 2, 2022.

(51) Int. Cl.
*E06B 3/72* (2006.01)
*E06B 3/70* (2006.01)
*E06B 3/88* (2006.01)

(52) U.S. Cl.
CPC .................. *E06B 3/72* (2013.01); *E06B 3/88* (2013.01); *E06B 2003/7013* (2013.01); *E06B 2003/7046* (2013.01)

(58) Field of Classification Search
CPC ..... E06B 2003/7011; E06B 2003/7013; E06B 3/72; E06B 3/88; E06B 2003/7046
See application file for complete search history.

(56) References Cited

U.S. PATENT DOCUMENTS

| | | | | | |
|---|---|---|---|---|---|
| 918,824 | A | 4/1909 | Caywood | | |
| 4,001,972 | A * | 1/1977 | Hurwitz | E06B 5/003 | 49/382 |
| 4,387,760 | A * | 6/1983 | Greschbach | E06B 3/481 | 160/199 |
| 8,082,971 | B1 * | 12/2011 | Peterson | E04B 2/7427 | 40/606.16 |

(Continued)

FOREIGN PATENT DOCUMENTS

| | | | | |
|---|---|---|---|---|
| CN | 213510278 U | 6/2021 | | |
| DE | 20000139 U1 * | 3/2000 | | E06B 3/481 |

(Continued)

*Primary Examiner* — Theodore V Adamos
(74) *Attorney, Agent, or Firm* — HAYNES ND BOONE, LLP

(57) ABSTRACT

A gate assembly for physical and aesthetic integration into any wall or fencing solution, and an associated method of assembling the same. The gate assembly includes a gate pivotably attached to a transom via a hinge. The gate includes side members and spacing tabs that create a channel system within the gate. The channel system is configured to receive a plurality of infill panels of various sizes and designs that aesthetically match the wall or fencing solution into which the gate assembly is being integrated. The gate further includes a cap attached to the top of the gate that traps the infill panels within the gate. When the gate is in a closed position, the cap is blocked by the transom, and no mechanical fasteners are accessible from either side of the gate assembly.

22 Claims, 12 Drawing Sheets

(56) References Cited

U.S. PATENT DOCUMENTS

| | | | |
|---|---|---|---|
| 9,617,776 B2 | 4/2017 | Farrell et al. | |
| 2003/0047293 A1* | 3/2003 | Lee | E06B 3/72 160/236 |
| 2008/0104908 A1 | 5/2008 | Jensen | |
| 2010/0300003 A1 | 12/2010 | Goode | |

FOREIGN PATENT DOCUMENTS

| | | | |
|---|---|---|---|
| FR | 3109399 A3 | | 10/2021 |
| WO | WO-2018072272 A1 | * | 4/2018 |

* cited by examiner

GATE APPARATUS AND METHOD

CROSS-REFERENCE TO RELATED APPLICATION

This application claims the benefit of the filing date of, and priority to, U.S. Provisional Patent Application No. 63/348,140, filed Jun. 2, 2022, the entire disclosure of which is hereby incorporated herein by reference.

FIELD OF THE DISCLOSURE

The present disclosure relates generally to gate apparatuses, assemblies, systems, and methods, and, more particularly, to a panic gate assembly designed for ingress and/or egress, that is secure, durable, and simple to integrate aesthetically and functionally with existing fencing (or "wall") solutions, and methods for manufacture and assembly of same.

BACKGROUND

Fencing solutions are used in a wide variety of applications and industries for security, safety, privacy, and decoration. Institutions and locations that often require such solutions include, for example, schools, commercial properties, public utilities, correctional facilities, entertainment buildings, recreational and athletic facilities, parking and storage facilities, and government facilities. Integrated within most fences is a gate that allows for ingress and egress through and across the boundary of the fence.

Because the specifications and requirements of each gate application may vary greatly in terms of dimensions, appearance, and functionality, gates are often custom designed and lack versatility. Having to custom design and uniquely manufacture a gate inherently increases the cost of a gate and fencing project.

In some instances, it has been impossible to integrate various types of aesthetic features of a fence application with a secure and functional gate. This is especially the case where the materials and features that make up the structure of the fence are unable to be welded.

As a result, there exists the need for a versatile gate design that can be integrated with a variety of fencing solutions, and which is durable, secure, and aesthetically pleasing. Such a gate design would improve manufacturability and be more cost effective.

DETAILED DESCRIPTION

Figure 1:
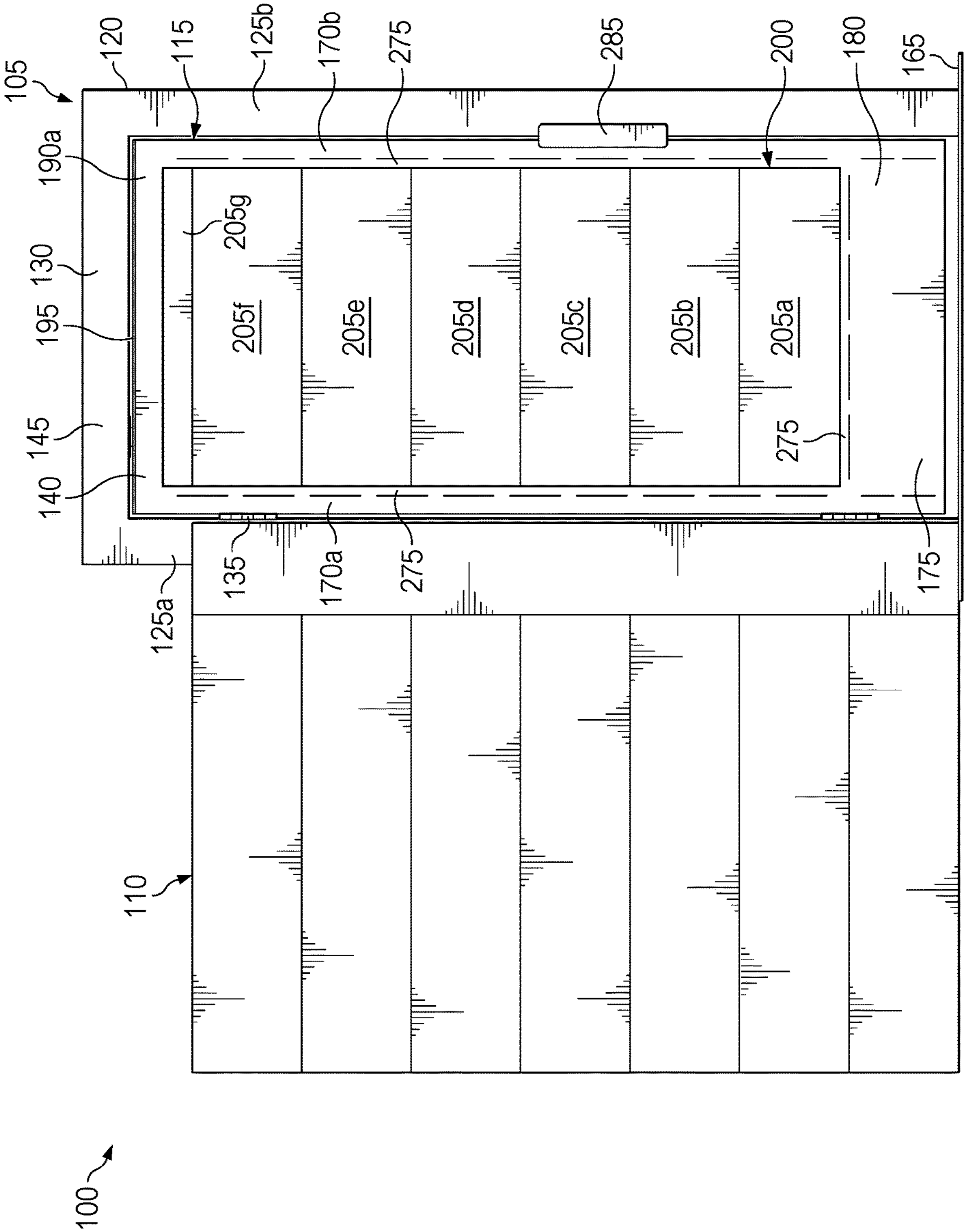
FIG. 1 is an elevational view illustrating an exterior side of a gate system, including a gate, a transom, and a portion of a fence, the gate and the transom being physically and aesthetically integrated with the portion of the fence, according to one or more embodiments of the present disclosure.

Referring to FIG. 1, a gate system 100 is shown according to one or more embodiments. The gate system 100 includes a gate assembly 105 and a fence 110 (or "wall"). The gate assembly 105 includes a gate 115 and a transom 120 (or "frame"). The gate assembly 105 is integrated physically and aesthetically with the fence 110. In one or more embodiments, the fence 110 extends from the transom 120 on both sides of the gate assembly 105. In other embodiments, the fence 110 extends from only one side of the transom 120 of the gate assembly 105.

In some embodiments, the gate assembly 105 may be a roll, swing, pivot, lift, or any other type of gate assembly 105 suitable for a desired application. Such other types of gate assemblies 105 would be readily apparent to those of ordinary skill in the art.

In the embodiment shown, the transom 120 has a pair of vertical posts 125*a*, 125*b* and a horizontal post 130. The pair of vertical posts 125*a*,125*b* and the horizontal post 130 are rectangular tubes. In one or more embodiments, the pair of vertical posts 125*a*,125*b* and the horizontal post 130 may have other cross-sectional profiles depending on the application. Each of the vertical posts 125*a*,125*b* has a top end and a bottom end. The horizontal post 130 has a first end and a second end. The horizontal post 130 spans the top ends of the pair of vertical posts 125*a*,125*b* such that the first end of the of the horizontal post 130 is attached at the top end of one of the vertical posts 125*a* and such that the second end of the horizontal post 130 is attached at the top end of the other vertical post 125*b*.

In some embodiments, the horizontal post 130 may be attached on top of the vertical posts 125*a*,125*b*, such that the horizontal post 130 forms an entire top surface or top edge of the transom 120. In other embodiments, the horizontal post 130 may be attached between the top ends of the pair of vertical posts 125*a*,125*b* such that the horizontal post 130 and the top ends of the pair of vertical posts 125*a*,125*b* together form the top surface or top edge of the transom 120.

The gate 115 is hingedly (or "pivotably") attached, connected, or otherwise mounted to the transom 120 via a hinge 135 or other suitable hardware that allows the gate 115 to have an open position (or "first configuration") in which ingress and/or egress through the gate assembly 105 is permitted, and a closed position (or "second configuration") in which ingress and/or egress through the gate assembly 105 is prevented.

In the closed position, the gate 115 hangs entirely, or almost entirely, within the transom 120, as shown in FIG. 1. In some embodiments, the depth (or "thickness") of the gate 115 and the depth of the transom 120 are the same such that when the gate 115 is in the closed position, an exterior surface 140 of the gate 115 and an exterior surface 145 of the transom 120, and an interior surface 150 of the gate 115 and an interior surface 155 of the transom 120, are coplanar, respectively. In other embodiments, the depth of the gate 115 may be less than the depth of the transom 120 such that when the gate 115 is in the closed position, the interior and/or exterior surface(s) 150,140 of the gate 115 are recessed from the interior and/or exterior surface(s) 155,145 of the transom 120, respectively. In the closed position, the transom 120 forms a perimeter around the sides and top of the gate 115.

Figure 2:
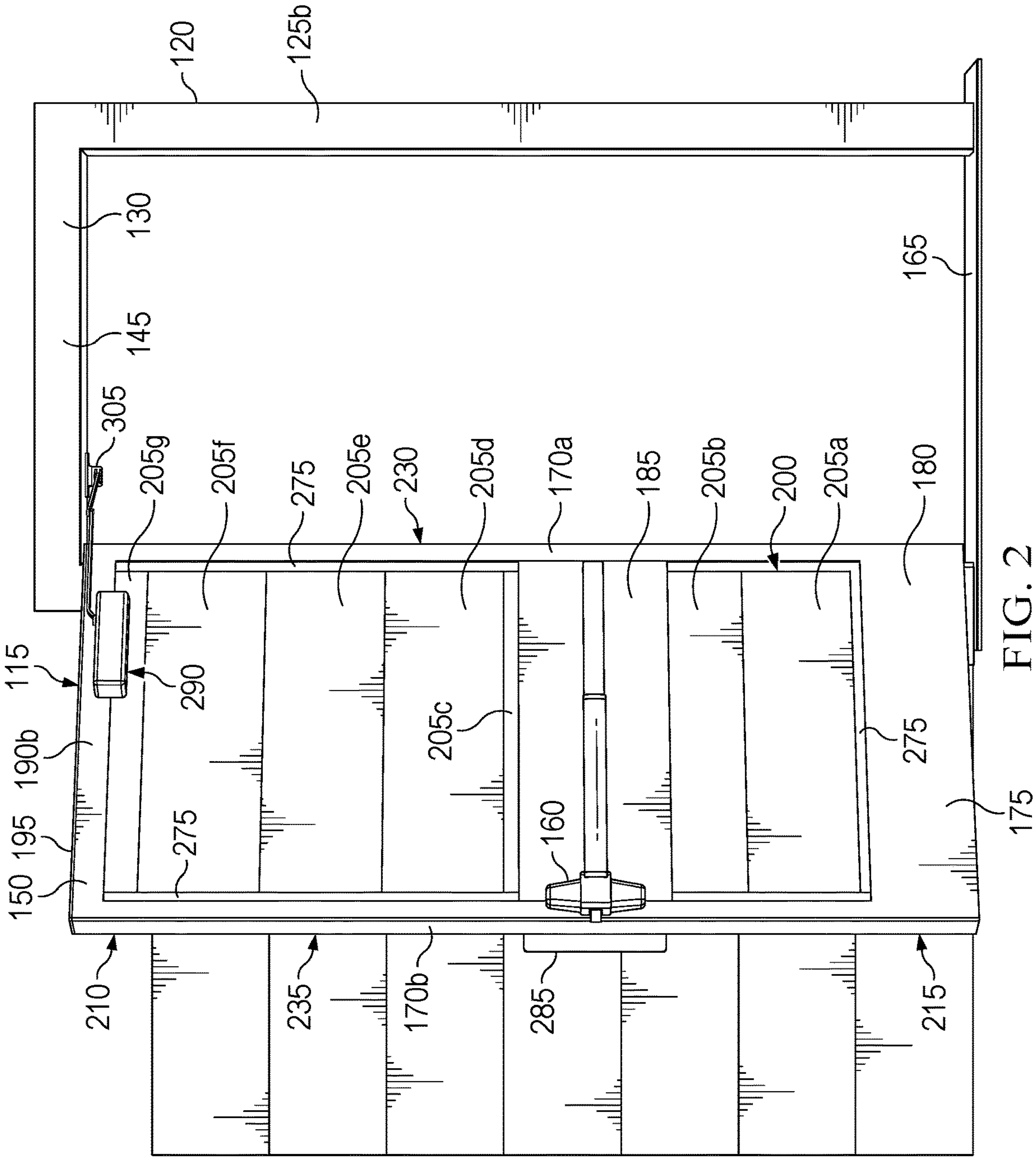
FIG. 2 is a perspective view illustrating an interior side of the gate of FIG. 1, according to one or more embodiments of the present disclosure.

The gate 115 is able to pivot about the hinge 135 from the closed position to the open position, and vice versa. In the open position, as shown in FIG. 2, the exterior surfaces 140,145 of the gate 115 and of the transom 120, and the interior surfaces 150,155 of the gate 115 and of the transom 120, are not coplanar, respectively. In FIG. 1, the gate 115 is shown in the closed position.

FIG. 1 depicts the external side and the exterior surface 140 of the gate 115 and of the fence 110. As shown, the gate assembly 105 is a panic gate and is designed for egress only, such that it can only be opened from the inside. In other embodiments, the gate assembly 105 may be designed for both ingress and egress, such that there is a gate actuating mechanism 160, shown in FIG. 2, on both the interior and exterior surfaces of the gate 115. In still other embodiments, the gate assembly 105 may be for ingress only such that the gate actuating mechanism 160 is only on the external surface of the gate 115. The gate 115 shown is designed to open outward relative to the area secured by the gate system 100. In other embodiments, the gate 115 may open inward relative to the area secured by the gate system 100.

As further shown in FIG. 1, when the gate 115 is mounted to the transom 120, the gate 115 is vertically spaced from the ground. This vertical space is optimized to prevent friction and to avoid contact with small obstacles and undulations in the ground surface that could cause blockages during actuation of the gate 115 between the open and closed positions, but also optimized to remain secure such that the vertical space does not enable intruders to gain access or use tools to compromise the gate 115. The same principles are applicable to the spacing of the gate 115 from the transom 120 around the rest of the perimeter of the gate 115. In one or more embodiments, the gate assembly 105 may be mounted to a flat ground plate 165 at the bottom of the gate 115 to provide further security and structural rigidity of the gate assembly 105. The ground plate 165 may be attached to and span the bottom ends of the vertical posts 125*a*,125*b*.

Referring to FIG. 2, the gate system 100 is shown with the gate 115 in the open position. The gate 115 has a pair of vertical side members 170*a*,170*b*, a bottom member 175, a kickplate 180, a panic plate 185, a pair of top members 190*a*,190*b*, a cap 195, a channel system 200, and a plurality of infill panels 205*a*-*g*. The gate 115 has a top end 210 and a bottom end 215. Each of the pair of vertical side members 170*a*,170*b* has a top end and a bottom end. In one or more embodiments, the top and bottom ends of the pair of vertical side members 170*a*,170*b* correspond with the top and bottom ends 210,215 of the gate 115, respectively.

In the embodiment shown, the gate 115 is rectangular is shape. The pair of vertical side members 170*a*,170*b* are horizontally spaced apart by the kickplate 180, the bottom member 175, and the pair of top members 190*a*,190*b*. The pair of vertical side members 170*a*,170*b* extend parallel to each other along opposing sides of the gate 115 between the bottom member 175 and the cap 195. One of the vertical side members 170*a* is mounted to the transom 120 via the hinge 135 and forms a hinged side 230 of the gate 115. The other vertical side member 170*b* forms a free side 235 of the gate 115.

The bottom member 175 is attached to the pair of vertical side members 170*a*,170*b* at the bottom end 215 of the gate 115. The bottom member 175 has a first end and a second end. The first end of the bottom member 175 is attached to the bottom end of one of the vertical side members 170*a*, and the second end of the bottom member 175 is attached to the bottom end of the other vertical side member 170*b*. The bottom member 175 thus forms the entire bottom surface of the gate 115 and defines the entire width of the gate 115. The depth (or "thickness") of the bottom member 175 is the same as the depth of the vertical side members 170*a*,170*b* such that interior and exterior surfaces of the bottom member 175 are flush with the interior and exterior surfaces of the vertical side members 170*a*,170*b*, respectively.

In other embodiments, the bottom member 175 is attached between the pair of vertical side members 170*a*,170*b* at the bottom ends of the vertical side members 170*a*,170*b* such that the bottom ends of the vertical side members 170*a*,170*b* and the bottom member 175 together form the bottom surface of the gate 115. In one or more embodiments, the bottom member 175 and the vertical side members 170*a*, 170*b* are attached together via welding.

As further shown in FIG. 2, the bottom end 215 of the gate 115 is reinforced by the kickplate 180. The kickplate 180 extends along the top surface of the bottom member 175 and extends between the pair of vertical side members 170*a*, 170*b* such that the pair of vertical side members 170*a*,170*b* extend along opposing sides of the kickplate 180. The kickplate 180 is welded to each of the vertical side members 170*a*,170*b* and to the bottom member 175. The kickplate 180 is formed of a solid material, which improves the security, rigidity, and durability of the gate 115. The depth (or "thickness") of the kickplate 180 is the same as the depth of the vertical side members 170*a*,170*b* such that the interior and exterior surfaces of the kickplate 180 are flush with the interior and exterior surfaces of the vertical side members 170*a*,170*b*, respectively.

In one or more embodiments, the gate 115 does not include the bottom member 175, and instead the kickplate 180 extends to the bottom of the gate 115 such that the bottom ends of the vertical side members 170*a*,170*b* and the bottom surface of the kickplate 180 together form the bottom surface of the gate 115. In such embodiments, the kickplate 180 extends along the bottom of the gate 115 between the vertical side members 170*a*,170*b* and is welded to the vertical side members 170*a*,170*b*.

In one or more embodiments, the kickplate 180 is vertically located between the bottom member 175 and the top members 190*a*,190*b*. In one or more embodiments, the kickplate 180 is vertically located between the bottom member 175 and the panic plate 185, which will be described in more detail below. The vertical height of the kickplate 180 may vary depending on the requirements of the application.

As further shown in FIG. 2, the panic plate 185 extends horizontally between the pair of vertical side members

170*a*,170*b* along the interior surface 150 of the gate 115. The panic plate 185 is vertically located between the pair of top members 190*a*,190*b* and the kickplate 180. The panic plate 185 adds further structural rigidity to the gate 115 and provides a mounting surface for gate actuating mechanisms 160 and latches.

The panic plate 185 is a flat bar and is attached to the vertical side members 170*a*,170*b* via welding. The interior surface of the panic plate 185 is flush with the interior surface 150 of the gate 115. The panic plate 185 does not extend through the depth of the gate 115. It only extends along the interior surface 150 of the gate 115, so as to not impede the infill panels 205*a-g*. The vertical height of the panic plate 185 may vary depending on the requirements of the application, including the size and style of the gate actuating mechanism 160 used in the particular application.

In one or more embodiments, the gate 115 has a second panic plate extending horizontally between the pair of vertical side members 170*a*,170*b* along the exterior surface 140 of the gate 115. The exterior surface of the second panic plate is flush with the exterior surface 140 of the gate 115. The second panic plate does not extend through the depth of the gate 115. In such embodiments, the second panic plate is also vertically located between the pair of top members 190*a*,190*b* and the kickplate 180. In one or more embodiments, the two panic plates are located at the same vertical location between the pair of top members 190*a*,190*b* and the kickplate 180 on either side of the gate 115. In one or more embodiments, the two panic plates are spaced apart a distance equal the depth of the vertical side members 170*a*,170*b*, less the depths of the panic plates. In one or more embodiments, the panic plates are spaced apart a distance substantially equal to the depth (or "thickness") of the infill panels 205*a-g*. In still other embodiments, there may be one panic plate (i.e., just the second panic plate) extending horizontally between the pair of vertical side members 170*a*,170*b* along the exterior surface 140 of the gate 115 and vertically located between the pair of top members 190*a*, 190*b* and the kickplate 180.

Referring to FIGS. 1-3B, the pair of top members 190*a*, 190*b* are attached to, and extend horizontally between, the vertical side members 170*a*,170*b* at the top end 210 of the gate 115. The top edges of the top members 190*a*,190*b* and the top edges of the top ends of the vertical side members 170*a*,170*b* are flush and lie on the same horizontal plane. The top members 190*a*,190*b* are flat bars. One of the top members 190*b* extends between the vertical side members 170*a*,170*b* along the interior surface 150 of the gate 115, and the other top member 190*a* extends between the vertical side members 170*a*,170*b* along the exterior surface 140 of the gate 115. The top members 190*a*,190*b* are attached to the vertical side members 170*a*,170*b* via welding.

Figure 3A:
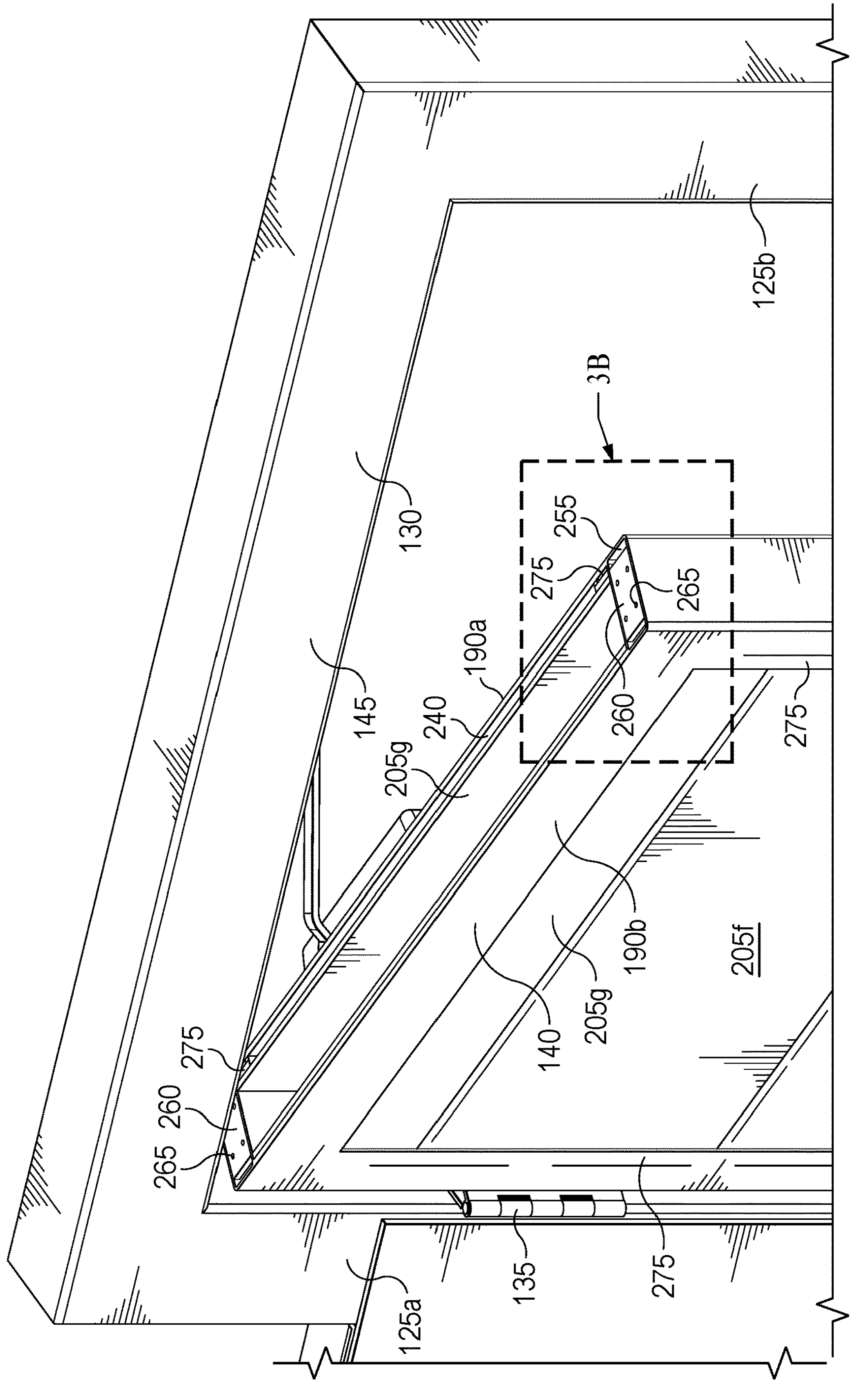
FIG. 3A is a perspective view illustrating a top end of the gate of FIG. 1, according to one or more embodiments of the present disclosure.

The pair of top members 190*a*,190*b* extend parallel to each other and are horizontally spaced apart a distance substantially equal to the depth of the vertical side members 170*a*,170*b* less the depths (or "thicknesses") of the top members 190*a*,190*b*. In one or more embodiments, the pair of top members 190*a*,190*b* are spaced apart a distance substantially equal to the depth of the infill panels 205*a-g*. Thus, the pair of top members 190*a*,190*b* form a slot 240 at the top end 210 of the gate 115, as shown in FIG. 3A. This slot 240, as will be discussed in more detail below, is configured to receive the plurality of infill panels 205*a-g*.

As will also be discussed in more detail below, the cap 195 is removably fastened or installed on the top end 210 of the gate 115. When the cap 195 is installed on the top end 210 of the gate 115, the top edges of the top members 190*a*,190*b*, and the top edges of the vertical side members 170*a*,170*b*, are in direct contact with the cap 195. When the cap 195 is installed on the top end 210 of the gate 115, the slot 240 is completely covered by the cap 195.

The vertical side members 170*a*,170*b*, the top members 190*a*,190*b*, and the kickplate 180 define a central opening 245 extending through the middle of the gate 115. As will be discussing in more detail below, the plurality of infill panels 205*a-g* will fill the central opening 245 in order to secure and aesthetically integrate the gate 115.

Figure 3B:
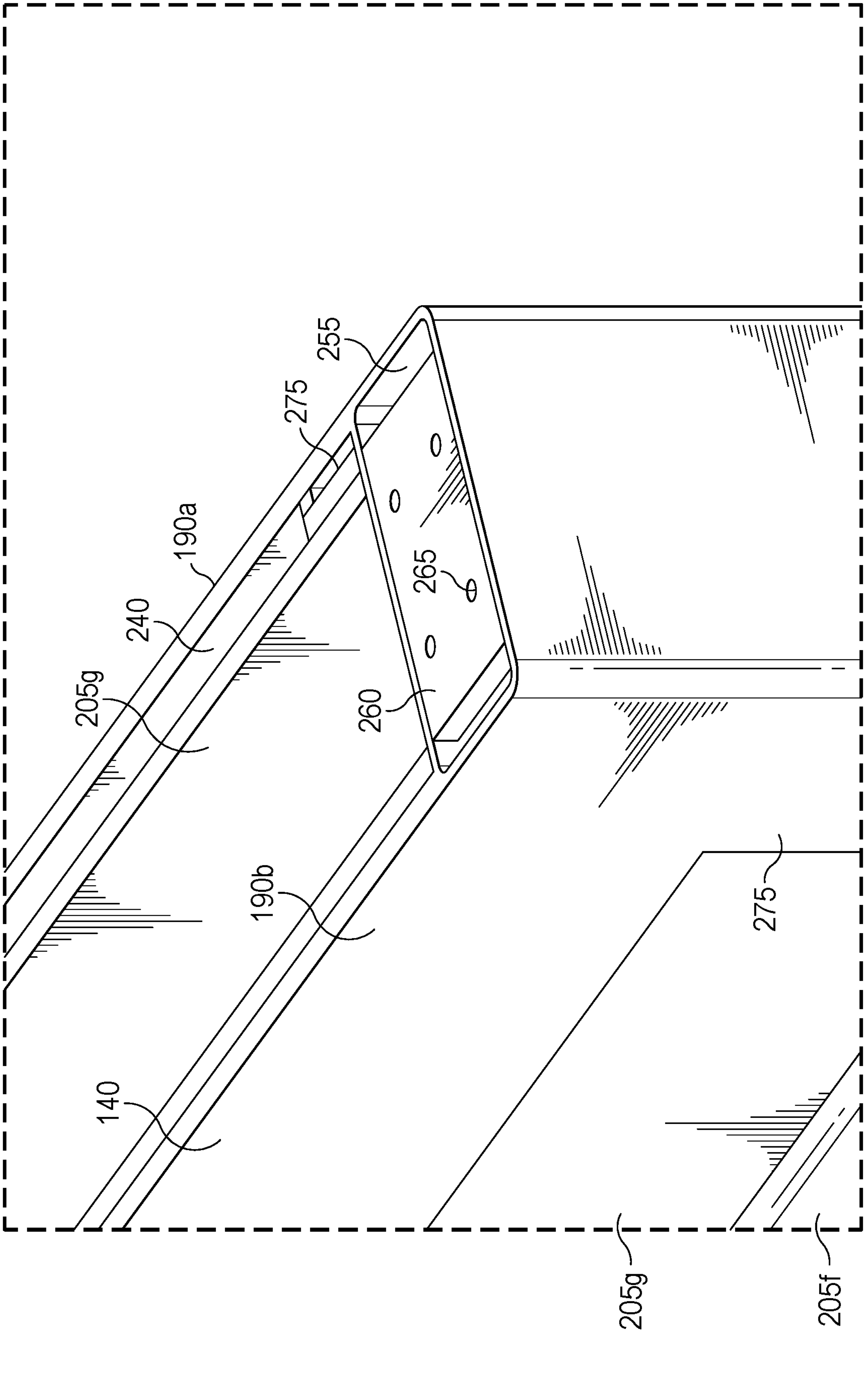
FIG. 3B is an enlarged view illustrating an anchor tab and a spacing tab of the gate of FIG. 1, according to one or more embodiments of the present disclosure.

As further shown in FIGS. 3A and 3B, the vertical side members 170*a*,170*b* have a rectangular tube structure, each defining an internal passageway extending therethrough from the top end to the bottom end of the vertical side member 170*a*,170*b*. The vertical side members 170*a*,170*b* also include openings at either end and an internal surface 255 surrounding the internal passageway. In other embodiments, the vertical side members 170*a*,170*b* may have a C-channel structure and may be oriented such that the open faces of the C-channel structures face inward relative to the outer perimeter of the gate 115, and thus face each other.

Received within the opening, and within the internal passageway, at the top end of each of the vertical side members 170*a*,170*b* is an anchor tab 260. The anchor tab 260 is a flat plate that is welded to the internal surface 255 and/or the top edges of the vertical side member 170*a*,170*b* at the top end of each vertical side member 170*a*,170*b*. Each anchor tab 260 includes at least one hole 265 configured to receive a fastener 270. In some embodiments, each anchor tab 260 has a plurality of holes 265 configured to receive a plurality of fasteners 270. Some of the holes 265 may be offset from each other. In one or more embodiments, the anchor tabs 260 have one or more nuts welded to the bottom surface of the anchor tab 260. The number of nuts attached to the anchor tab 260 corresponds with the number of holes 265 in the anchor tab 260 and each nut is coaxially aligned with one of the holes 265 and welded to the bottom of the anchor tab 260. The nuts secure the fastener 270 received through the hole 265. As will be described in more detail below with respect to FIGS. 5 and 6, the anchor tabs 260 facilitate attachment of the cap 195 to the top end 210 of the gate 115.

Referring to FIGS. 1-4, the gate 115 further includes the channel system 200. The channel system 200 includes a plurality of spacing tabs 275. On the exterior side of the gate 115, as shown in FIG. 1, one spacing tab 275 extends vertically along each of the vertical side members 170*a*, 170*b*. The vertically extending spacing tabs 275 extend along the inner edge of each vertical side member 170*a*,170*b* that is adjacent the central opening 245 and coplanar with the exterior surface 140 of the gate 115. The vertically extending spacing tabs 275 extend between the top member 190*a* and the kickplate 180 such that an exterior surface of each spacing tab 275 is flush with the exterior surface 140 of the gate 115. The spacing tabs 275 extending along the vertical side members 170*a*,170*b* are attached to the top member 190*a*, the vertical side members 170*a*,170*b*, and to the kickplate 180 via welding.

Another spacing tab 275 extends horizontally between the two vertically extending spacing tabs 275 on the exterior surface 140 of the gate 115. The horizontally extending spacing tab 275 extends along a top edge of the kickplate 180 that is adjacent the central opening 245 of the gate 115 and is coplanar with the exterior surface 140 of the gate 115. The horizontally extending spacing tab 275 is welded at either end to the bottom ends of the vertically extending spacing tabs 275 and is welded to the kickplate 180 along the aforementioned edge of the kickplate 180.

The spacing tabs 275 extend inward into the central opening 245 from the vertical side members 170*a*,170*b* and from the kickplate 180 toward the middle of the gate 115 and away from the outer perimeter of the gate 115.

In the embodiment shown, the spacing tabs 275 are flat rectangular bars. In one or more embodiments, the spacing tabs 275 extending along the exterior surface 140 of the gate 115 have a depth (or "thickness") equal to the depth of the top member 190*a* on the exterior side of the gate 115. The width of the spacing tabs 275 extending along the exterior surface 140 of the gate 115 may vary depending on the application.

As shown in FIG. 2, there are spacing tabs 275 located on the interior side of the gate 115 in the same respective locations and orientations as those described above with respect to the exterior side of the gate 115. On the interior side of the gate 115, however, the spacing tabs 275 are offset from the interior surface 150 of the gate 115, and thus are also offset from the edges of the vertical side members 170*a*,170*b* and the edge of the kickplate 180 along which they extend. As such, the spacing tabs 275 on the interior side of the gate 115 are recessed into the central opening 245 of the gate 115 and are located between the interior surface and the exterior surface 140 of the gate 115. Also, in the embodiment shown, the vertically extending spacing tabs 275 on the interior side of the gate 115 extend between the kickplate 180 and the top edge of the top member 190*b* on the interior surface 150 of the gate 115. Thus, the vertically extending spacing tabs 275 on the interior side of the gate 115 extend into the slot 240 at the top end 210 of the gate 115 between the pair of top members 190*a*,190*b*, as is shown in FIGS. 3A and 3B.

Because the spacing tabs 275 on the interior side of the gate 115 are recessed from the interior surface 150 of the gate 115, the spacing tabs 275 on the interior side of the gate 115 are located between the top member 190*b* on the interior side of the gate 115 and the exterior surface 140 of the gate 115, and between the panic plate 185 on the interior surface 150 of the gate 115 and the exterior surface 140 of the gate 115. The spacing tabs 275 on the interior side of the gate 115 extend behind, inside, or inward of the top member 190*b* and the panic plate 185 on the interior surface 150 of the gate 115.

In one or more embodiments, the spacing tabs 275 extend along the vertical side members 170*a*,170*b* only, and do not extend along the top of the kickplate 180. In one or more embodiments, the top of the kickplate 180 has a recess configured to receive and seat a portion of one of the infill panels 205*a*.

In one or more embodiments, the spacing tabs 275, the vertical side members 170*a*,170*b*, and the kickplate 180 define the channel system 200. In one or more embodiments, the top members 190*a*,190*b* also define a portion of the channel system 200. In one or more embodiments, the panic plate 185 also defines a portion of the channel system 200.

In one or more embodiments, the spacing tabs 275 on the interior side of the gate 115 are flush with the interior surface 150 of the gate 115, and the spacing tabs 275 on the exterior side of the gate 115 are offset or recessed from the exterior surface 140 of the gate 115. In one or more embodiments, both the spacing tabs 275 on the interior side of the gate 115 and the spacing tabs 275 on the exterior side of the gate 115 may be offset or recessed from the interior surface and the exterior surface 140 of the gate 115, respectively. In general, the locations and or offset(s) of the spacing tabs 275 are determined such that the spacing tabs 275 on the interior surface 150 of the gate 115 and the spacing tabs 275 on the exterior surface 140 of the gate 115 are spaced apart a distance substantially equal to the depth of the infill panels 205*a*-*g*.

The width of the spacing tabs 275 may vary depending on the requirements of the application. The width of the spacing tabs 275 is directly related to the 'height' of the channel system 200, which affects how much of each infill panel is directly received into the channel system 200 on either side (i.e., hinged side 230 and free side 235) of the gate 115. In general, the wider the spacing tabs 275, the sturdier the channel system 200 and the more secure the infill panels 205*a*-*g* will be within the central opening 245 of the gate 115. The tradeoff with wider spacing tabs 275, however, is that the visible surface area of the infill panels 205*a*-*g*, which aesthetically integrates the gate 115 with the fence 110, will be reduced.

Figure 4:
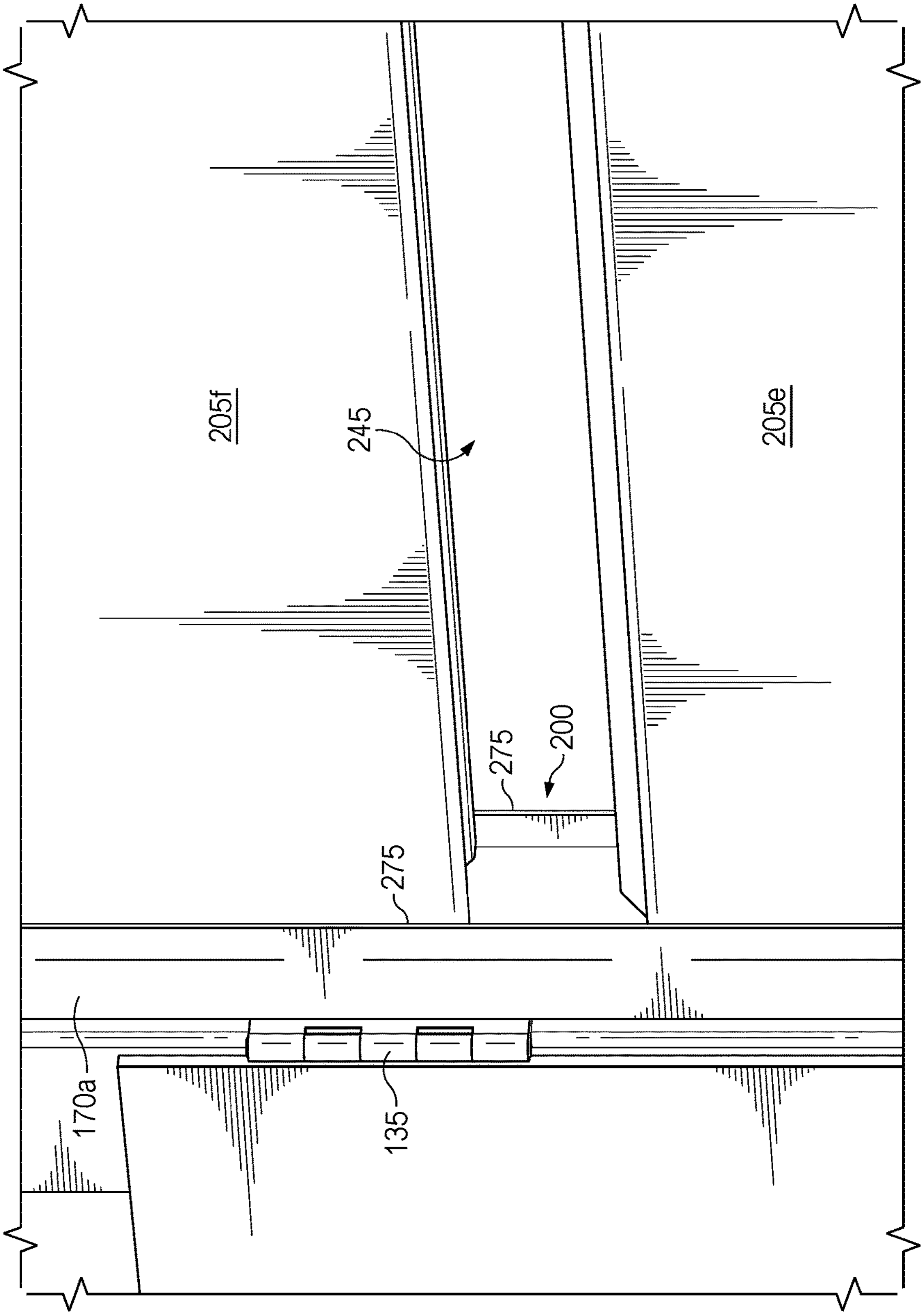
FIG. 4 is a partially-exploded perspective view illustrating a plurality of infill panels inside the gate of FIG. 1, according to one or more embodiments of the present disclosure.

Referring to FIGS. 3A-4, the channel system 200 extends from the top end 210 of the gate 115 to the kickplate 180 and is configured to receive and guide the plurality of infill panels 205*a*-*g* down into the gate 115. As shown in FIG. 3A, with the cap 195 removed from the gate 115, the infill panels 205*a*-*g* are received into the gate 115 via the slot 240 at the top of the gate 115, which is formed by the top members 190*a*,190*b*. The channel system 200 then guides the infill panel down into the gate 115 between the vertical side members 170*a*,170*b*, between the top members 190*a*,190*b*, between the spacing tabs 275 on the hinged side 230 of the gate 115, and between the spacing tabs 275 on the free side 235 of the gate 115. The infill panels 205*a*-*g* are located inwardly of the panic plate(s) 185. When installed, the infill panels 205*a*-*g* cover and fill the central opening 245.

As further shown in FIG. 3A, the channel system 200 is configured to receive infill panels 205*a*-*g* of all different sizes, styles, appearances, and material compositions. Depending on the depth (or "thickness") of the infill panels 205*a*-*g* with which the gate 115 is to be used, the offset of the spacing tabs 275 can be adjusted during manufacturing. If the infill panels 205*a*-*g* are thinner, the offset of the spacing tabs 275 can be increased, thus locating the spacing tabs 275 deeper into the gate 115 and reducing the size of the channel system 200. If the infill panels 205*a*-*g* are thicker, the offset of the spacing tabs 275 can be reduced, thus locating the spacing tabs 275 closer to the interior surface 150 of the gate 115 and increasing the size of the channel system 200.

Once the gate 115 is manufactured, with the spacing tabs 275 installed, the gate 115 can be used with a wide variety of infill panels 205*a*-*g*. For any give size of the channel system 200, any infill panel having that size, regardless of style, design, material, etc., can be used with the gate 115.

In one or more embodiments, the size of the channel system 200 can also be adjusted to accommodate different sized infill panels 205*a*-*g* by using spacing tabs 275 of greater or lesser depth. In one or more embodiments, a singe gate assembly 105 can be reused with infill panels 205*a*-*g* having a different depth by adding, removing, or moving the spacing tabs 275 with limited modification. Spacing tabs 275 can be added, removed, or moved by welding in additional spacing tabs 275 is series and by grinding off old welds, respectively. In this manner, the gate 115 can be extremely versatile in regard to aesthetic integration while remaining structurally secure and unmodified, or substantially unmodified.

An optimized channel size ensures that the infill panels 205*a*-*g* fit securely within the channel system 200. The spacing tabs 275 are configured to hold the infill panels 205*a-g* tightly against each other, against the spacing tabs 275, against the top members 190*a*,190*b*, and against the panic plate(s) 185. This optimal spacing and location of the spacing tabs 275, and the resultant sizing of the channel system 200 is shown in FIG. 4, which depicts two infill panels 205*a-g* being installed within the channel system 200.

Figure 11:
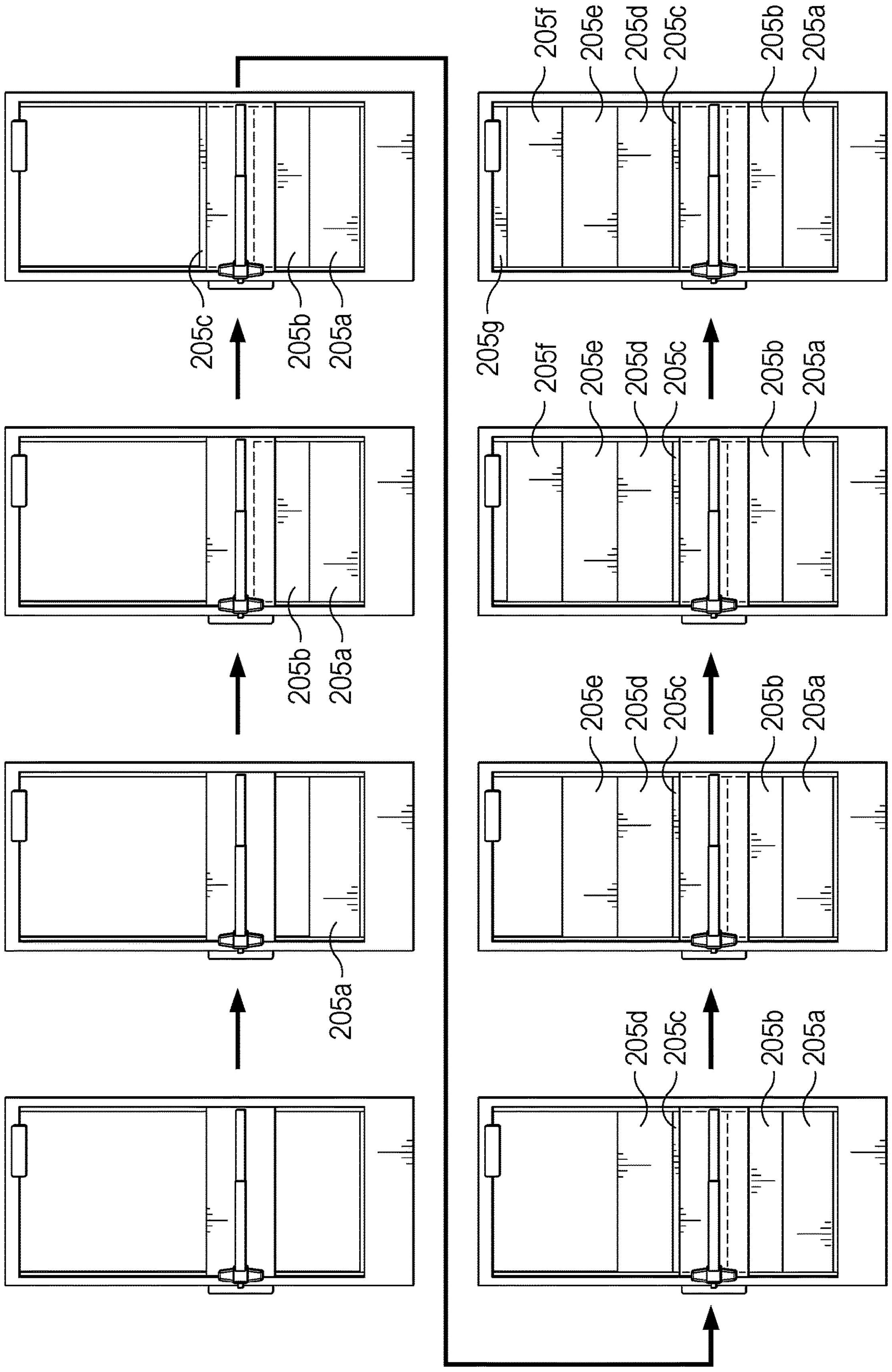
FIG. 11 illustrates a method of installing the plurality of infill panels inside the gate of FIG. 1, according to one or more embodiments of the present disclosure.

With continued reference to FIGS. 3A-4, and also to FIG. 11, when installing the infill panels 205*a-g*, the first infill panel 205*a* is inserted into the slot 240 at the top of the gate 115 and is slid down the channel system 200 until it abuts the kickplate 180. Each infill panel 205*a-g* is sized appropriately such that it makes contact with both of the vertical side members 170*a*,170*b* and with spacing tabs 275 on both the interior and exterior surface 140 of the gate 115. This ensures that the infill panels 205*a-g* are not loose and that the gate 115 is secure.

The next infill panel 205*b* is then inserted into the slot 240 and is slid down until it abuts the top of the previously inserted infill panel. FIG. 4 depicts two infill panels 205*a-g* within the channel system 200 just before they come into contact with each other. In the embodiment shown, the infill panels 205*a-g* have a male and female end such that adjacent infills panels can cooperate and interconnect to increase the strength and security of the gate 115. In other embodiments, the top and bottom ends of the infill panels 205*a-g* may be flat.

This process is repeated until the infill panels 205*a-g* fill the channel system 200. In some embodiments, as shown in FIG. 3A, the last inserted infill panel is modified, such as by cutting, trimming, chamfering, tapering, grinding, etc., so that the top of the last infill panel is flush with the top edges of the top members 190*a*,190*b*, and the top edges of the vertical side members 170*a*,170*b*, at the top end 210 of the gate 115. The infill panels 205*a-g* completely fill the central opening 245 of the gate 115.

The versatility and interchangeability of the infill panels 205*a-g* in the gate 115 allows the gate assembly 105 to match the aesthetics of the fence 110 into which the gate assembly 105 is physically integrated. Whatever size, style, and brand of panel is used for the fence 110 can also be used for the infill panels 205*a-g* in the gate 115 so that the gate 115 matches the aesthetics of the fence 110. As a result, the need for a custom gate assembly 105 in many applications is eliminated.

In many other applications, providing a matching gate 115 was previously impossible because of the inability to weld or otherwise incorporate the particular type of infill material of the fence 110 into the gate 115. The channel system 200 as described herein now provides the option to have a matching gate 115 that is aesthetically integrated into a fence 110 using such infill materials that previously would have been unavailable for use in a gate 115. In addition, because the gate system 100 is so versatile, its manufacturability and cost effectiveness are greatly improved. The single, standard design of the gate assembly 105 disclosed herein, which can be integrated into a variety of applications, can therefore be manufactured in much greater quantities and with much lower costs as compared to manufacturing a custom gate assembly 105 for every unique application.

Figure 5:
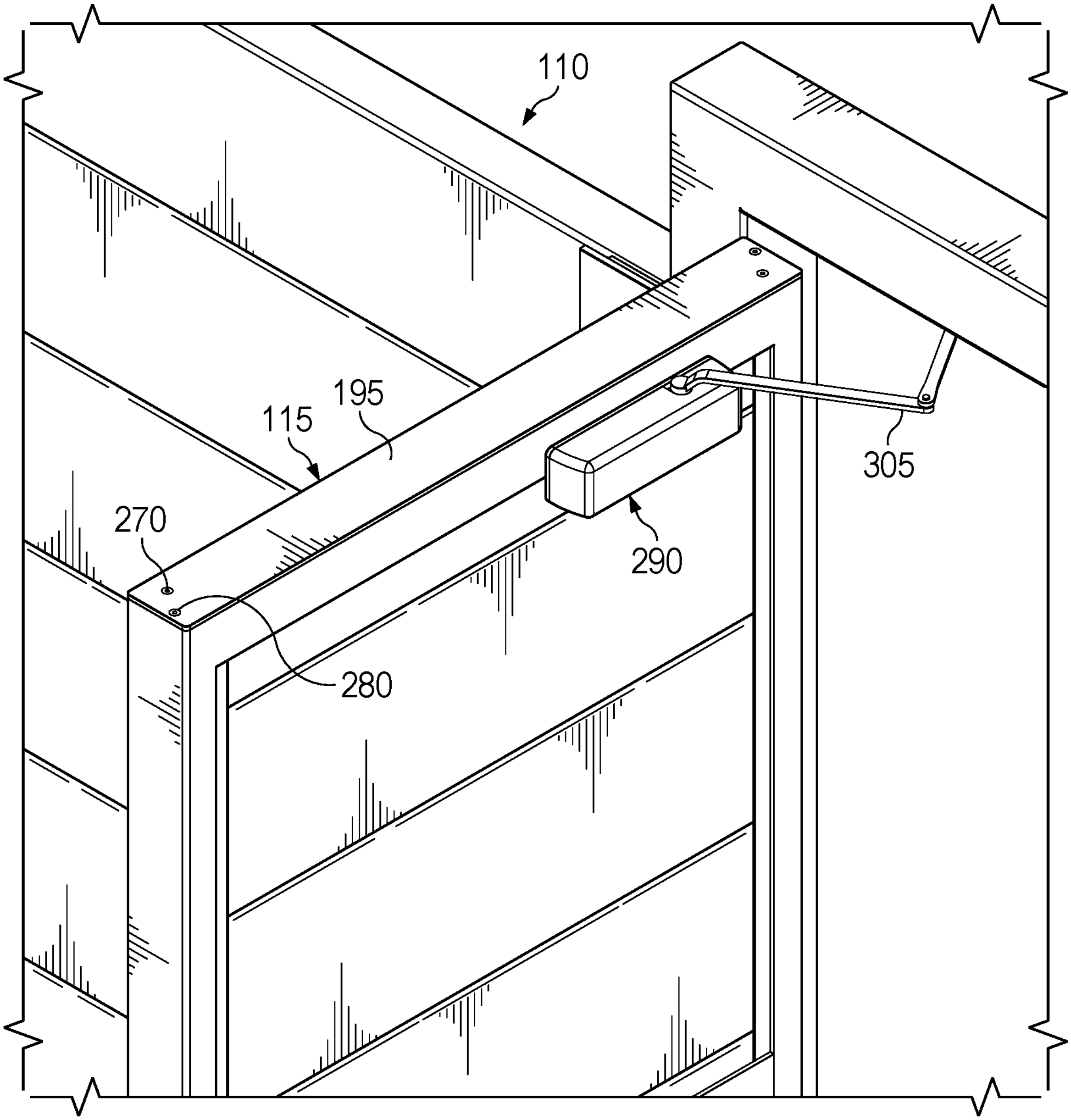
FIG. 5 is a perspective view illustrating the top end of the gate of FIG. 1 with a cap installed on the top end of the gate, according to one or more embodiments of the present disclosure.
Figure 6:
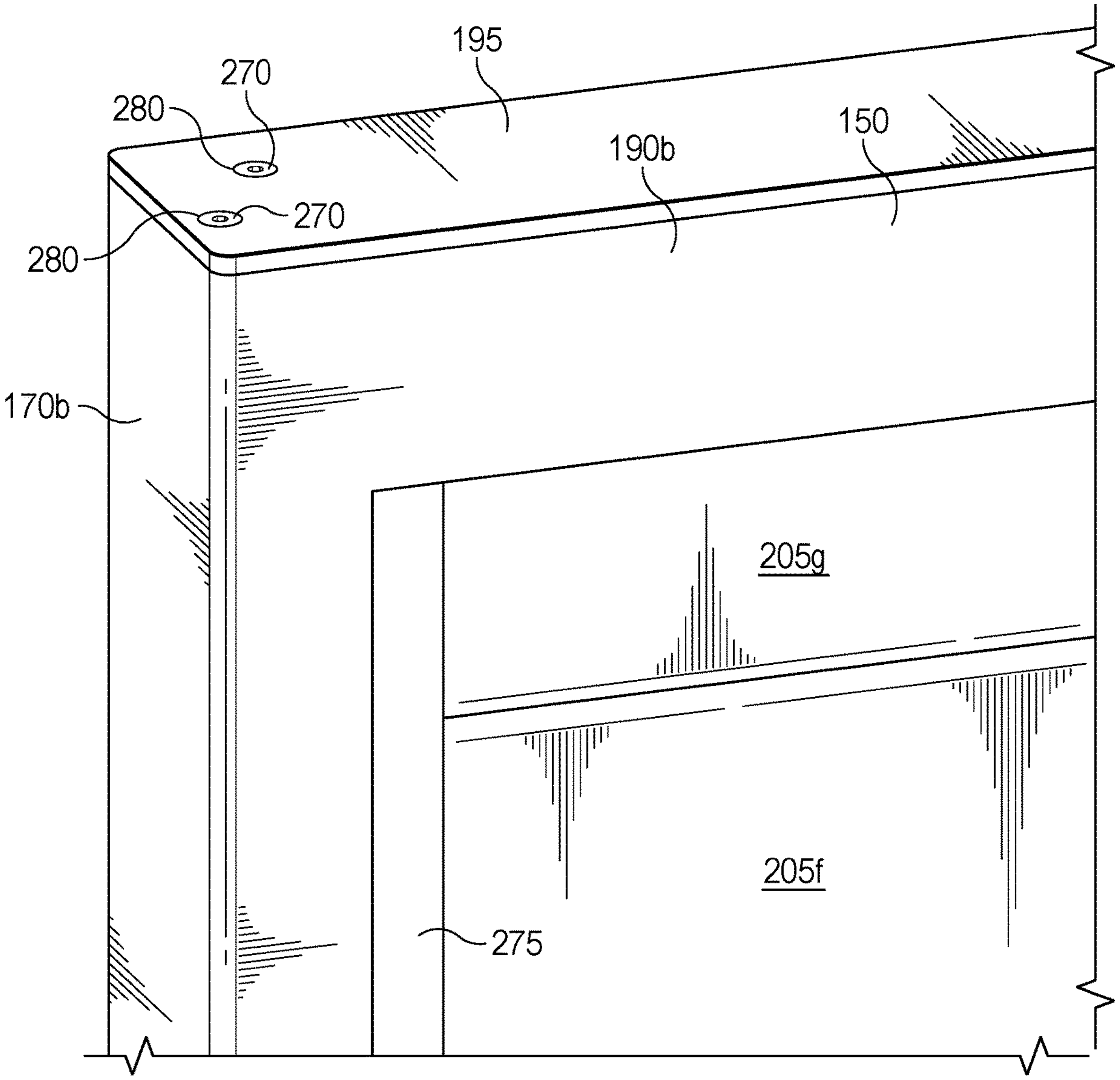
FIG. 6 is another perspective view illustrating the top end of the gate of FIG. 1 with the cap installed, according to one or more embodiments of the present disclosure.

Referring now to FIGS. 5 and 6, the cap 195 is shown installed on the gate 115. The cap 195 is removably attached at each of its ends to the anchor tabs 260. The cap 195 extends along the entire top end 210 of the gate 115, completely covering the slot 240 and sealing (or "trapping") the infill panels 205*a-g* within the channel system 200. The cap 195 contacts the top edges of the vertical side members 170*a*,170*b*, the top members 190*a*,190*b*, and the last installed infill panel 205*g*. The cap 195 secures the infill panels 205*a-g* in tight contact with each other and with the kickplate 180. The cap 195 prevents vertical movement of the infill panels 205*a-g* within the channel system 200 of the gate 115. This helps secure the gate 115 and prevents infill panels 205*a-g* from being removed by intruders and prevents tool, such as pry-bars, from being inserted between the infill panels 205*a-g*.

The cap 195 includes one or more holes 280 that are each coaxially aligned with one of the holes 265 of the anchor tab 260 when the cap 195 is positioned to be installed on the gate 115. Fasteners 270 are inserted into holes 280 in the cap 195 that correspond with the holes 265 in the anchor tabs 260. The fasteners 270 secure and removably attach the cap 195 to the anchor tabs 260. Where present, the fasteners 270 are further secured by removably engaging with the nuts welded to the bottom of the anchor tabs 260.

The fasteners 270 attaching the cap 195 to the gate 115 are only accessible when the gate 115 is in the open position. When the gate 115 is in the closed position, there are no mechanical fasteners 270 accessible from the interior side of the gate 115, the exterior side of the gate 115, above the gate 115, or below the gate 115 that could compromise the security of the gate 115. Such positioning of the cap 195 and fasteners 270 allows the gate 115 to have its versatile design with interchangeable infill panels 205*a-g* while at the same time remaining secure.

In the embodiment shown in FIGS. 5 and 6, the cap 195 sits entirely on top of the vertical side members 170*a*,170*b* and the top members 190*a*,190*b*. In one or more embodiments, the cap 195 may have a vertically extending portion (or "skirt") extending from the edges of the cap 195 around the entire perimeter of the cap 195, forming a recess in the cap 195 configured to receive a portion of the top end 210 of the gate 115. The vertically extending portion of the cap 195 thus extends around a portion of the gate 115 below the top edges of the gate 115.

Figure 7:
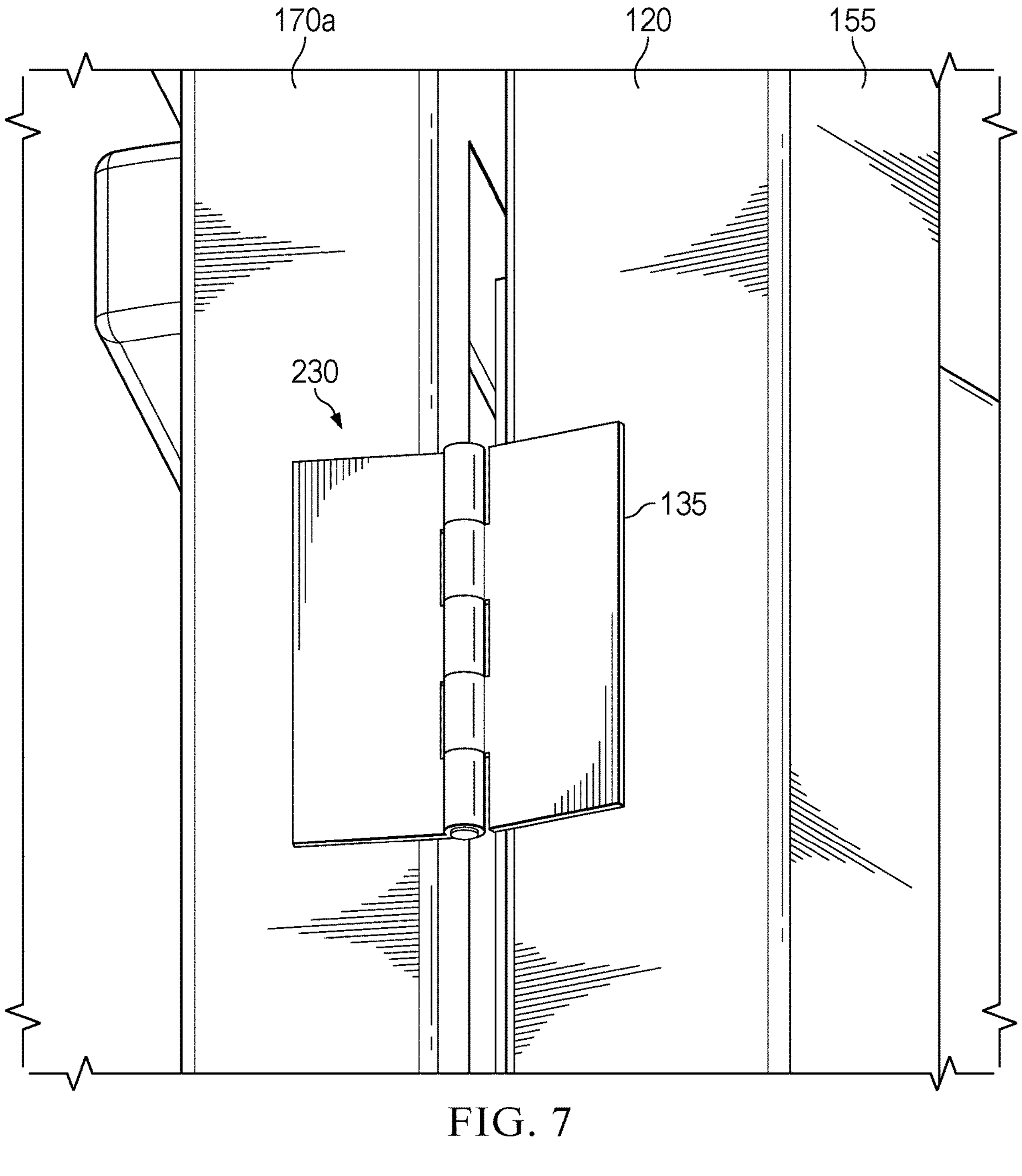
FIG. 7 is a perspective view illustrating a hinge of the gate system of FIG. 1, according to one or more embodiments of the present disclosure.

Referring to FIG. 7, the gate assembly 105 has at least one hinge 135 pivotably mounting the gate 115 to the transom 120. One side of the hinge 135 is attached to one of the vertical side members 170*a*, on the hinged side 230 of the gate 115, and the other side of the hinge 135 is attached to the transom 120. The method of attachment is welding. In one or more embodiments, where strength, security, and corrosion due to exposure to harsh environmental conditions is less of a concern, the method of attachment may be via mechanical fastening. The two sides of the hinge 135 have mounting points that coaxially align with each other and that are configured to receive a pin that pivotably connects the two sides of the hinge 135 together.

In one or more embodiments, the pin is a security pin with a unique key or release mechanism to prevent tampering and removal by intruders or other unauthorized users. In other embodiments, the pin may have a pair of pin caps welded to either end of the pin after the pin has been installed in the hinge 135 to create a permanent installation. In still other embodiments, one side of the hinge 135 may have a security tab protruding from its top surface, and the other side of the hinge 135 may have a corresponding recess in its top surface, and which is configured to receive the security tab within the recess when the gate 115 is in the closed position. When the gate 115 is in the closed position and the security tab is received within the recess, the gate 115 is prevented from being separated from the transom 120 via the hinge 135 even if the pin of the hinge 135 is tampered with and removed. In one or more embodiments, the hinge 135 may be a recessed hinge of a known type. The recessed hinge would provide further security by further restricting access to the hinge by intruders or other unauthorized users.

Figure 8:
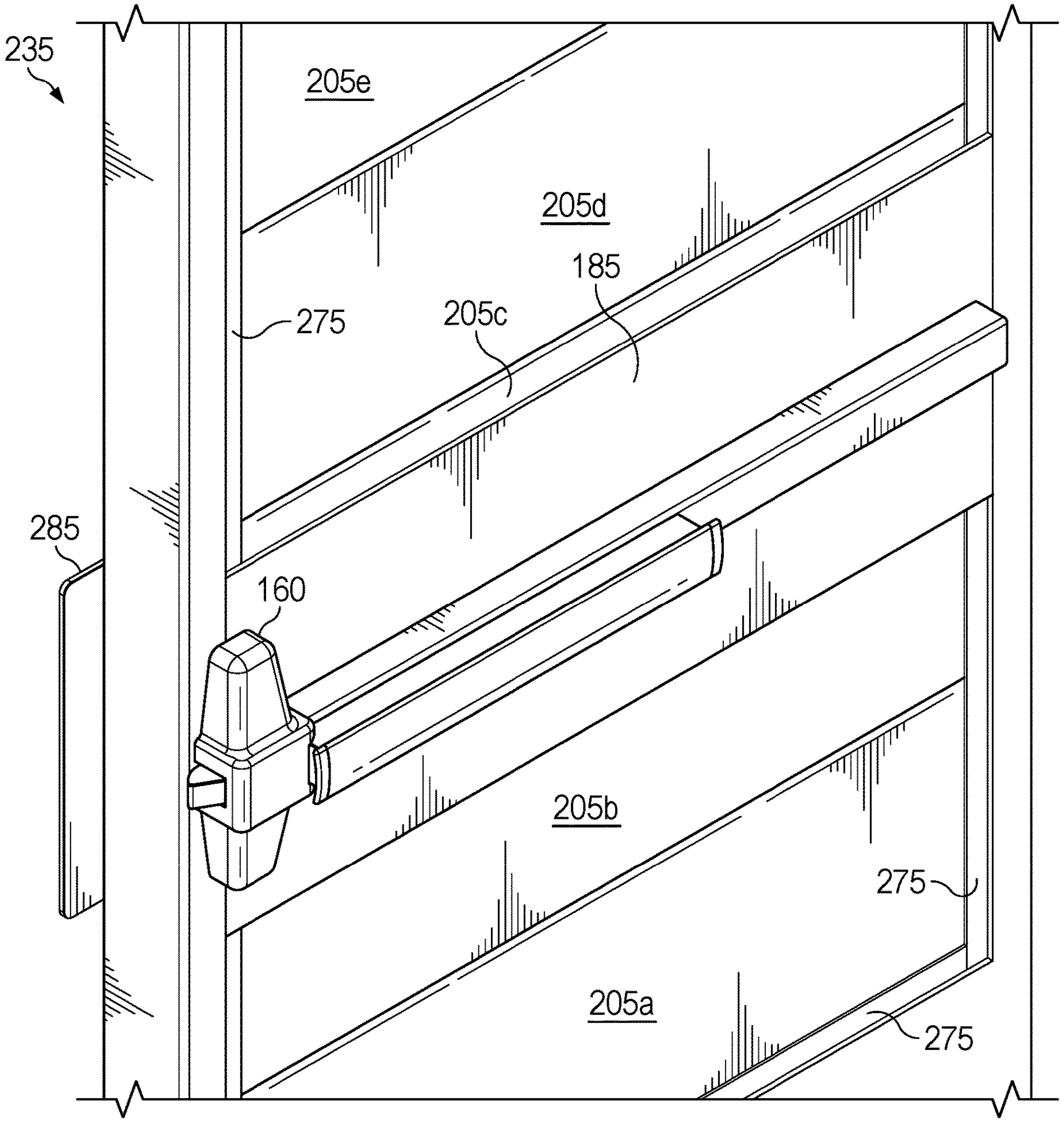
FIG. 8 is a perspective view illustrating a panic bar and an astragal of the gate of FIG. 1, according to one or more embodiments of the present disclosure.

In one or more embodiments, as shown in FIG. 8, the gate actuating mechanism 160 may be a panic bar that is mounted to the panic plate 185 on the interior surface 150 of the gate 115. The panic bar is configured to be depressed, causing its latch to release, and thus allowing the gate 115 to be pivoted from the closed position to the open position. In one or more embodiments, the gate actuating mechanism 160 may be a doorknob, push bar, handle, lever, or other mechanism that would be readily apparent one of ordinary skill in the art. In one or more embodiments, where the gate 115 is configured for both ingress and egress, a second gate actuating mechanism may be attached to the second panic plate on the exterior surface 140 of the gate 115.

In one or more embodiments, as shown in FIG. 8, the gate 115 has an astragal 285 attached to one of the vertical side members 170*a*,170*b* on the exterior surface 140 of the gate 115. The astragal 285 is attached to the vertical side member 170*b* on the free side 235 of the gate 115 and protrudes out from the gate 115 widthwise, in the direction opposite the hinged side 230 of the gate 115 and outward from the perimeter of the gate 115. The astragal 285 is configured to protect the latch from being compromised by an intruder from the exterior side of the gate 115.

Figure 9:
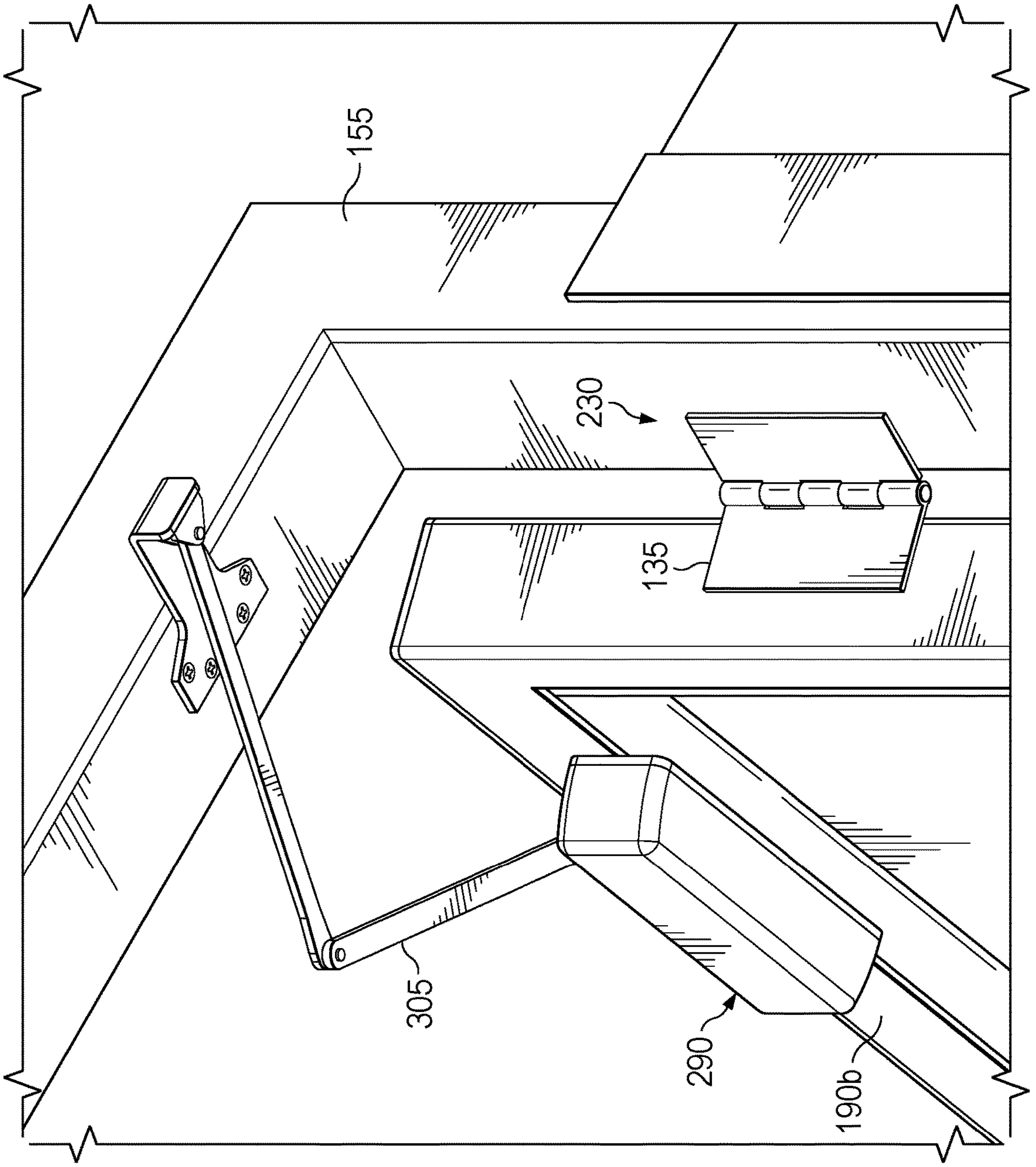
FIG. 9 is a perspective view illustrating a gate closer of the gate system of FIG. 1, according to one or more embodiments of the present disclosure.
Figure 10:
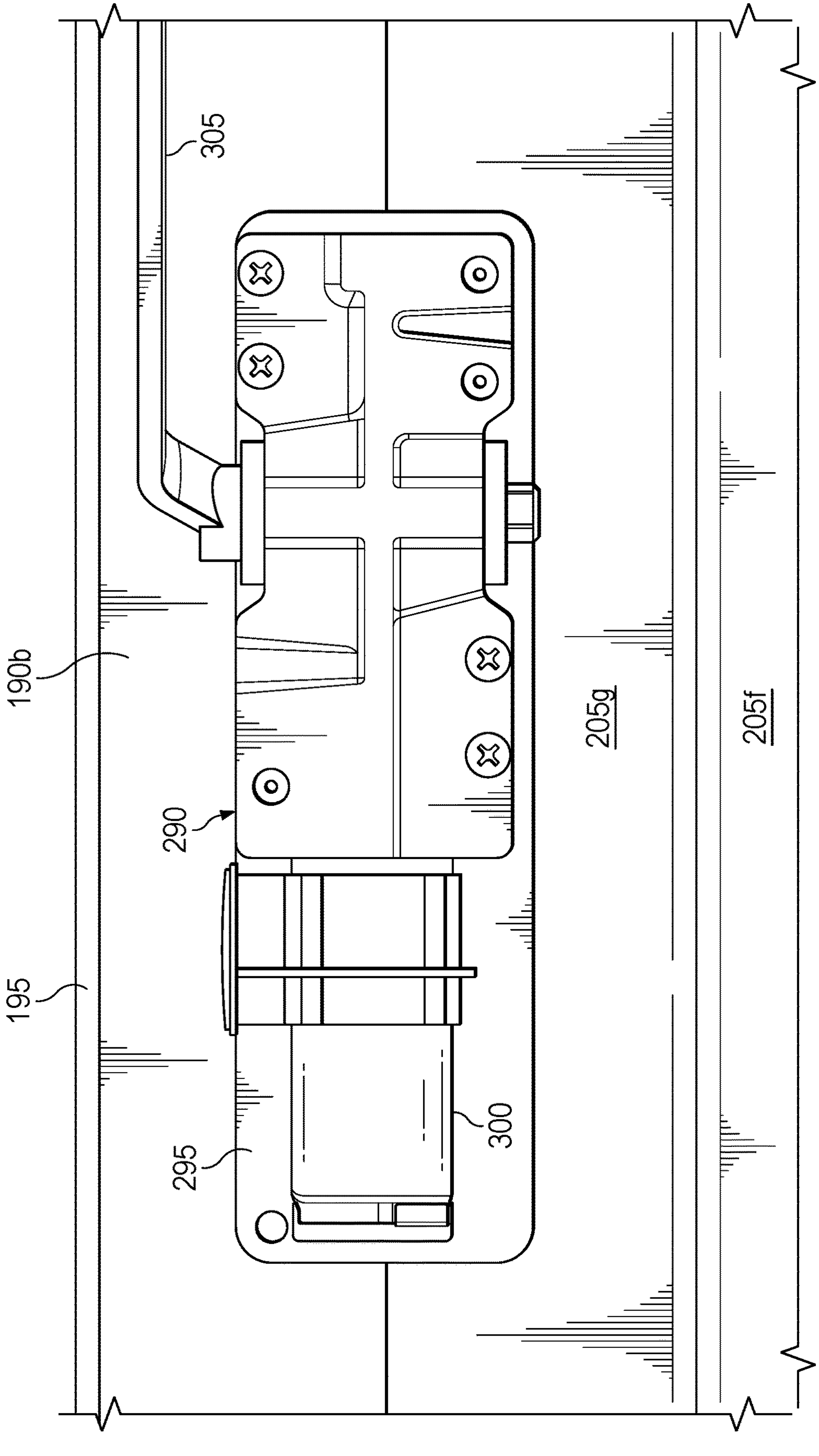
FIG. 10 is an elevational view of the gate closer of FIG. 9 without a cover, according to one or more embodiments of the present disclosure.

In one or more embodiments, as shown in FIGS. 9 and 10, the gate 115 may include a gate closer 290. In one or more embodiments, the gate closer 290 may be one of a known type. The gate closer 290 has a mounting plate 295, a spring and/or hydraulic assist mechanism 300, and a control arm 305. The gate closer 290 is biased to return the gate 115 to the closed position from the open position. The mounting plate 295 is welded to the top member 190*b* and/or the vertical side member 170*a* on the interior surface 150 of the gate 115 near the hinged side 230 of the gate 115. The assist mechanism 300 is attached to the mounting plate 295. The control arm 305 is attached to the transom 120.

Referring now to FIG. 11, a method of installing the infill panels 205*a-g* in the gate 115 is illustrated. As shown in the first illustration of the gate 115, the gate 115 is entirely assembled as one solid unit, except for the removable infill panels 205*a-g* and the cap 195. As shown in the first illustration of the gate 115, the gate 115 is initially empty with no infill panels 205*a-g* installed in the channel system 200 and thus no infill panels 205*a-g* covering the central opening 245 of the gate 115.

As shown in the next illustration of the gate 115 along the method flow path, a first infill panel 205*a* is installed in the gate 115. The first infill 205*a* panel is received within the slot 240 at the top end 210 of the gate 115 and within the channel system 200. The first infill panel 205*a* is then slid down the channel system 200 until it abuts the kickplate 180, as shown.

The next illustration of the gate 115 along the method flow path illustrates a second infill panel 205*b* installed within the gate 115. The second infill panel 205*b* is received within the slot 240 at the top end 210 of the gate 115 and within the channel system 200. The second infill panel 205*b* is then slid down the channel system 200 into the gate 115 until it abuts the top of the first infill panel 205*a*.

This process is repeated until the infill panels 205*a-g* fill the channel system 200 and completely cover and secure the central opening 245 in the gate 115. As shown and described with respect to FIG. 3A, the last infill panel may be cut, or otherwise modified, so that it is flush with the top edges of the vertical side members 170*a*,170*b* and the top edges of the top members 190*a*,190*b*.

As disclosed above, the main components of the gate assembly 105 are attached via welding. The vertical side members 170*a*,170*b* are welded to the bottom member 175 and to the top members 190*a*,190*b*, the kickplate 180 is welded to the vertical side members 170*a*,170*b* and to the bottom member 175, the spacing tabs 275 and the panic plate(s) 185 are welded to the vertical side members 170*a*, 170*b*, the anchor tabs 260 are welded to the vertical side members 170*a*,170*b*, the hinge 135 is welded to the gate 115 and to the transom 120, the astragal 285 is welded to the gate 115, and the mounting plate 295 of the door closer is welded to the gate 115. These components are all made of steel. In some embodiments, they may be formed from other metals. Attachment via welding creates a secure gate assembly 105 that, as described above, has no mechanical fasteners 270 accessible from either side of the gate assembly 105 when the gate 115 is in the closed position. This prevents the gate assembly 105 from being compromised or breached by intruders as it can only be disassembled when the gate 115 is in the open position.

Welding the components together also improves the gate assembly's 105 durability and resistance to rust and corrosion. Once all of the main components of the gate assembly 105 have been welded together, they are then galvanized and powder coated. In one or more embodiments, the components receive a two-coat powder coating. No further fastening, welding, or cutting is required in the field, which reduces the incidence of damage to the finish that could leave bare metal exposed to harsh environmental conditions and elements. This is especially critical for the hinge 135, which is a point of freedom and movement of the gate assembly 105. The two sides of the hinge 135 are welded to the vertical side member 170*a* and to the transom 120, respectively, and then are all galvanized and powder coated together. All that is required for final assembly of the hinge 135 is the insertion of the hinge pin through the corresponding mounting points of both sides of the hinge 135. As a result of this design, the anti-corrosion treatments and coatings are less likely to be damaged upon assembly and operation.

In some embodiments, the gate assembly 105 may not be subjected to a galvanization process and may not receive powder coatings. In some embodiments, the gate assembly 105 may receive other types of surface finishes that would be desirable for the particular application, and which would be readily apparent to one of ordinary skill in the art.

The present disclosure introduces an apparatus, the apparatus comprising: a plurality of infill panels; a gate defining a channel system adapted to receive the plurality of infill panels, the gate comprising: a pair of side members, wherein the pair of side members are spaced apart and extend parallel to each other along opposing sides of the gate; and a plurality of spacing tabs, wherein each of the side members includes at least two of the spacing tabs extending along a length thereof; wherein the channel system is adapted to receive the plurality of infill panels between the pair of side members; and wherein, when the channel system receives the plurality of infill panels between the pair of side members, each infill panel extends: between at least two of the spacing tabs extending along one of the side members; and between at least two of the spacing tabs extending along the other of the side members; and a cap adapted to be attached to the gate so that, when the channel system receives the plurality of infill panels between the pair of side members and the cap is attached to the gate: the cap extends transversely to the direction of extension of the parallel-spaced side members and traps the plurality infill panels within the channel system such that the plurality of infill panels cannot be removed from the gate; the cap engages respective top ends of the side members in the direction of extension of the parallel-spaced side members; and at least a portion of the cap is located outside of the channel system. In one embodiment, the plurality of infill panels are received by the channel system, and wherein the cap is attached to the gate, so that: the cap extends transversely to the direction of extension of the parallel-spaced side members and traps the plurality infill panels within the channel system such that the plurality of infill panels cannot be removed from the gate; the cap engages respective top ends of the side members in the direction of extension of the parallel-spaced side members; and at least a portion of the cap is located outside of the channel system; wherein the gate further comprises anchor tabs attached to the top ends of the side members, respectively; wherein each anchor tab includes at least one opening; wherein the cap includes openings so that the openings of the cap are respectively aligned with the openings of the anchor tabs; wherein the apparatus further comprises fasteners extending through the openings of the cap, respectively, and received by the openings of the anchor tabs, respectively, to attach the cap to the gate; wherein the gate further comprises a pair of top members extending between the parallel-spaced side members, each of the top members extending transversely to the direction of extension of the parallel-spaced side members; wherein the pair of top members at least partially define a slot through which at least respective portions of the infill panels pass when the channel system receives the plurality of infill panels; wherein the apparatus further comprises a transom to which the gate is pivotally attached via a hinge; wherein the hinge is attached to the transom and to one of the side members; wherein the gate is pivotable between a closed configuration and an open configuration; and wherein, when the gate is in the closed configuration: the side members of the gate are bordered by the transom; and the cap is located, relative to the gate and the transom, so that the transom prevents removal of the cap from the gate. In one embodiment, the gate further comprises anchor tabs attached to the top ends of the side members, respectively; and wherein each anchor tab includes at least one opening adapted to receive a fastener. In one embodiment, the apparatus further comprises the fasteners; wherein the cap includes openings so that when the cap is attached to gate: the openings of the cap are respectively aligned with the openings of the anchor tabs; and the fasteners extend through the openings of the cap, respectively, and are received by the openings of the anchor tabs, respectively, to attach the cap to the gate. In one embodiment, the gate further comprises: a pair of top members extending between the parallel-spaced side members, each of the top members extending transversely to the direction of extension of the parallel-spaced side members. In one embodiment, the pair of top members at least partially define a slot through which at least respective portions of the infill panels pass when the channel system receives the plurality of infill panels. In one embodiment, the cap completely covers the slot when the cap is attached to the gate. In one embodiment, the apparatus further comprises a transom to which the gate is adapted to be pivotally attached via a hinge; wherein, when the gate is pivotally attached to the transom via the hinge: the hinge is attached to the transom and to one of the side members; and the gate is pivotable between a closed configuration and an open configuration. In one embodiment, when the cap is attached to the gate, the gate is pivotally attached to the transom via the hinge, and the gate is in the closed configuration: the side members of the gate are bordered by the transom; and the cap is located, relative to the gate and the transom, so that the transom prevents removal of the cap from the gate.

The present disclosure introduces a system, the system comprising: a fence; and an apparatus; wherein the apparatus comprises: a plurality of infill panels; a gate comprising a channel system adapted to receive the plurality of infill panels, the gate comprising: a pair of side members, wherein the pair of side members are spaced apart and extend parallel to each other along opposing sides of the gate; and a plurality of spacing tabs, wherein each of the side members includes at least two of the spacing tabs extending along a length thereof; wherein the channel system is adapted to receive the plurality of infill panels between the pair of side members; and wherein, when the channel system receives the plurality of infill panels between the pair of side members, each infill panel extends: between at least two of the spacing tabs extending along one of the side members; and between at least two of the spacing tabs extending along the other of the side members; and a cap adapted to be attached to the gate so that, when the channel system receives the plurality of infill panels between the pair of side members and the cap is attached to the gate: the cap extends transversely to the direction of extension of the parallel-spaced side members and traps the plurality infill panels within the channel system such that the plurality of infill panels cannot be removed from the gate; the cap engages respective top ends of the side members in the direction of extension of the parallel-spaced side members; and at least a portion of the cap is located outside of the channel system; wherein the apparatus is adapted to be physically integrated with the fence to provide a point of ingress and/or egress through the fence. In one embodiment, the plurality of infill panels are received by the channel system, and wherein the cap is attached to the gate, so that: the cap extends transversely to the direction of extension of the parallel-spaced side members and traps the plurality infill panels within the channel system such that the plurality of infill panels cannot be removed from the gate; the cap engages respective top ends of the side members in the direction of extension of the parallel-spaced side members; and at least a portion of the cap is located outside of the channel system; wherein the gate further comprises anchor tabs attached to the top ends of the side members, respectively; wherein each anchor tab includes at least one opening; wherein the cap includes openings so that the openings of the cap are respectively aligned with the openings of the anchor tabs; wherein the apparatus further comprises fasteners extending through the openings of the cap, respectively, and received by the openings of the anchor tabs, respectively, to attach the cap to the gate; wherein the gate further comprises a pair of top members extending between the parallel-spaced side members, each of the top members extending transversely to the direction of extension of the parallel-spaced side members; wherein the pair of top members at least partially define a slot through which at least respective portions of the infill panels pass when the channel system receives the plurality of infill panels; wherein the apparatus further comprises a transom to which the gate is pivotally attached via a hinge; wherein the hinge is attached to the transom and to one of the side members; wherein the gate is pivotable between a closed configuration and an open configuration; and wherein, when the gate is in the closed configuration: the side members of the gate are bordered by the transom; and the cap is located, relative to the gate and the transom, so that the transom prevents removal of the cap from the gate. In one embodiment, the gate further comprises anchor tabs attached to the top ends of the side members, respectively; and wherein each anchor tab includes at least one opening adapted to receive a fastener. In one embodiment, the system further comprises the fasteners; wherein the cap includes openings so that when the cap is attached to gate: the openings of the cap are respectively aligned with the openings of the anchor tabs; and the fasteners extend through the openings of the cap, respectively, and are received by the openings of the anchor tabs, respectively, to attach the cap to the gate. In one embodiment, the system further comprises, a transom to which the gate is adapted to be pivotally attached via a hinge; wherein, when the gate is pivotally attached to the transom via the hinge: the hinge is attached to the transom and to one of the side members; and the gate is pivotable between a closed configuration and an open configuration. In one embodiment, when the cap is attached to the gate, the gate is pivotally attached to the transom via the hinge, and the gate is in the closed configuration: the side members of the gate are bordered by the transom; and the cap is located, relative to the gate and the transom, so that the transom prevents removal of the cap from the gate.

The present disclosure introduces a method of assembling a gate, the method comprising: (a) aligning a first infill panel of a plurality of infill panels vertically above the gate, the gate comprising a channel system adapted to receive the plurality of infill panels, the gate further comprising: a pair of side members, wherein the pair of side members are spaced apart and extend parallel to each other along opposing sides of the gate; a plurality of spacing tabs, wherein each of the side members includes at least two of the spacing tabs extending along a length thereof; wherein the channel system is adapted to receive the plurality of infill panels between the pair of side members; and wherein, when the channel system receives the plurality of infill panels between the pair of side members, each infill panel extends: between at least two of the spacing tabs extending along one of the side members; and between at least two of the spacing tabs extending along the other of the side members; a cap adapted to be attached to the gate so that, when the channel system receives the plurality of infill panels between the pair of side members and the cap is attached to the gate: the cap extends transversely to the direction of extension of the parallel-spaced side members and traps the plurality infill panels within the channel system such that the plurality of infill panels cannot be removed from the gate; the cap engages respective top ends of the side members in the direction of extension of the parallel-spaced side members; and at least a portion of the cap is located outside of the channel system; and a kickplate extending between the pair of side members at a bottom end of the gate; (b) inserting the first infill panel into the channel system at a top end of the gate; (c) sliding the first infill panel down into the channel system until it abuts the kickplate at the bottom end of the gate; (d) inserting another infill panel of the plurality of infill panels into the channel system and sliding it down into the channel system until it abuts the first infill panel; and (e) repeating step (d) until the channel system is completely filled by the plurality of infill panels. In one embodiment, the method further comprises modifying the last inserted infill panel so that the last inserted infill panel is flush with the top end of the gate. In one embodiment, the method further comprises: attaching the cap to the top end of the gate; wherein the cap extends along the entire top end of the gate; and wherein the cap traps the plurality of infill panels within the channel system. In one embodiment, the gate further comprises anchor tabs attached to the top ends of the side members, respectively; wherein each anchor tab includes at least one opening adapted to receive a fastener; and wherein the anchor tabs and the cap are adapted to receive the plurality of fasteners via which the cap is attached to the anchor taps. In one embodiment, the method further comprises: mounting, pivotably via a hinge, the gate within a transom.

The present disclosure introduces a method, the method including: inserting first and second infill panels into a channel system defined by a gate, the gate including: a pair of side members, wherein the pair of side members are spaced apart and extend parallel to each other along opposing sides of the gate; and a plurality of spacing tabs, wherein each of the side members includes at least two of the spacing tabs extending along a length thereof; wherein, after the first and second infill panels are inserted into the channel system defined by the gate, each of the first and second infill panels extends: between the pair of side members; between at least two of the spacing tabs extending along one of the side members; and between at least two of the spacing tabs extending along the other of the side members; and attaching a cap to the gate so that: the cap extends transversely to the direction of extension of the parallel-spaced side members and traps the first and second infill panels within the channel system such that the first and second infill panels cannot be removed from the gate; the cap engages respective top ends of the side members in the direction of extension of the parallel-spaced side members; and at least a portion of the cap is located outside of the channel system. In one embodiment, the gate further includes anchor tabs attached to the top ends of the side members, respectively; and wherein the cap is attached to the gate via the anchor tabs. In one embodiment, each anchor tab includes at least one opening adapted to receive a fastener; and wherein attaching the cap to the gate comprises extending the fasteners through the cap so that the fasteners are received by respective ones of the openings. In one embodiment, the gate further includes: a pair of top members extending between the parallel-spaced side members, each of the top members extending transversely to the direction of extension of the parallel-spaced side members. In one embodiment, the pair of top members at least partially define a slot through which at least respective portions of the first and second infill panels pass during the insertion of the first and second infill panels into the channel system. In one embodiment, the cap completely covers the slot when the cap is attached to the gate. In one embodiment, the method further includes attaching the gate to a transom. In one embodiment, attaching the gate to the transom includes: pivotally attaching the gate to the transom, via a hinge, so that: the hinge is attached to the transom and to one of the side members; and the gate is pivotable between a closed configuration and an open configuration. In one embodiment, when the gate is in the closed configuration: the side members of the gate are bordered by the transom; and the cap is located, relative to the gate and the transom, so that the transom prevents removal of the cap from the gate. In one embodiment, inserting the first and second infill panels into the channel system defined by the gate includes: sliding the first infill panel into the channel system until the first infill panel abuts a kickplate located at a bottom end of the gate; and sliding the second infill panel into the channel system until the second infill panel abuts the first infill panel. In one embodiment, the method further includes: inserting additional infill panel(s) into the channel system until the channel system is filled by the first infill panel, the second infill panel, and the additional infill panel(s); and modifying the last additional infill panel so that, after the last additional infill panel is inserted into the channel system and the channel system is filled by the first infill panel, the second infill panel, and the additional infill panel(s), the last additional infill panel is flush with the respective top ends of the side members of the gate.

It is understood that variations may be made in the foregoing without departing from the scope of the disclosure.

In several embodiments, the elements and teachings of the various illustrative embodiments may be combined in whole or in part in some or all of the illustrative embodiments. In addition, one or more of the elements and teachings of the various illustrative embodiments may be omitted, at least in part, or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, or one or more of the procedures may also be performed in different orders, simultaneously or sequentially. In several embodiments, the steps, processes or procedures may be merged into one or more steps, processes or procedures. In several embodiments, one or more of the operational steps in each embodiment may be omitted. Moreover, in some instances, some features of the present disclosure may be employed without a corresponding use of the other features. Moreover, one or more of the embodiments disclosed above, or variations thereof, may be combined in whole or in part with any one or more of the other embodiments described above, or variations thereof.

Although several embodiments have been disclosed in detail above, the embodiments disclosed are illustrative only and are not limiting, and those skilled in the art will readily appreciate that many other modifications, changes, and substitutions are possible in the embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus, comprising:

a plurality of infill panels;

a gate defining a channel system adapted to receive the plurality of infill panels, the gate comprising:

a pair of members spaced apart and extending parallel to each other, each member including opposing first and second surfaces and a third surface extending between the opposing first and second surfaces, the respective first surfaces of the pair of members being coplanar and the respective second surfaces of the pair of members being coplanar; and a plurality of spacing tabs including first and second spacing tabs extending along the third surface of each of the pair of members, the first spacing tabs extending flush with the respective first surfaces of the pair of members and the second spacing tabs extending entirely offset from the respective first and second surfaces of the pair of members such that the respective first and second spacing tabs are spaced apart along the respective third surfaces a distance substantially equal to a maximum depth of each of the plurality of infill panels;

wherein the channel system is adapted to receive the plurality of infill panels between the pair of members; and wherein, when the plurality of infill panels are received within the channel system between the pair of members, each infill panel contacts another infill panel within the channel system and extends between and contacts:

the third surface of each respective member of the pair of members; and the first and second spacing tabs extending along the third surface of each respective member of the pair of members;

and a cap adapted to be attached to the gate such that, when the plurality of infill panels are received within the channel system between the pair of members:

the cap extends transversely to the direction of extension of the pair of members and traps the plurality infill panels within the channel system such that the plurality of infill panels cannot be removed from the gate;

the cap engages respective first ends of the pair of members in the direction of extension of the pair of members; and at least a portion of the cap is located outside of the channel system.

2. The apparatus of claim 1, wherein the plurality of infill panels are received by the channel system, and wherein the cap is attached to the gate, so that:

the cap extends transversely to the direction of extension of the pair of members and traps the plurality infill panels within the channel system such that the plurality of infill panels cannot be removed from the gate;

the cap engages the respective first ends of the pair of members in the direction of extension of the pair of members; and at least a portion of the cap is located outside of the channel system;

wherein the gate further comprises anchor tabs attached to the first ends of the pair of members, respectively;

wherein each anchor tab includes at least one opening;

wherein the cap includes openings, each opening of the cap corresponding to and aligning with a respective opening of the anchor tabs;

wherein the apparatus further comprises fasteners extending through the openings of the cap, respectively, and received by the openings of the anchor tabs, respectively, to attach the cap to the gate;

wherein the gate further comprises a pair of additional members extending between the pair of members, each of the additional members extending transversely to the direction of extension of the pair of members;

wherein the pair of additional members at least partially define a slot through which at least respective portions of the infill panels pass when the channel system receives the plurality of infill panels;

wherein the apparatus further comprises a transom to which the gate is pivotally attached via a hinge;

wherein the hinge is attached to the transom and to one member of the pair of members;

wherein the gate is pivotable between a closed configuration and an open configuration;

and wherein, when the gate is in the closed configuration:

the pair of members of the gate are bordered by the transom; and the cap is located, relative to the gate and the transom, so that the transom prevents removal of the cap from the gate.

3. The apparatus of claim 1, wherein the gate further comprises anchor tabs attached to the first ends of the pair of members, respectively; and wherein the cap is adapted to be attached to the gate via the anchor tabs.

4. The apparatus of claim 3, further comprising fasteners;

wherein each anchor tab includes at least one opening adapted to receive one of the fasteners;

wherein the cap includes openings so that when the cap is attached to the gate:

each opening of the cap corresponds to and aligns with a respective opening of the anchor tabs; and each fastener extends through a respective opening of the cap and is received by a respective opening of the anchor tabs to attach the cap to the gate.

5. The apparatus of claim 1, wherein the gate further comprises:

a pair of additional members extending between the parallel-spaced members, each of the additional members extending transversely to the direction of extension of the pair of members.

6. The apparatus of claim 5, wherein the pair of additional members at least partially define a slot through which at least a portion of each of the plurality of infill panels passes when the channel system receives the plurality of infill panels.

7. The apparatus of claim 6, wherein the cap completely covers the slot when the cap is attached to the gate.

8. The apparatus of claim 1, further comprising a transom to which the gate is adapted to be pivotally attached via a hinge;

wherein, when the gate is pivotally attached to the transom via the hinge:

the hinge is attached to the transom and to one of the pair of members; and the gate is pivotable between a closed configuration and an open configuration.

9. The apparatus of claim 8, wherein, when the cap is attached to the gate, the gate is pivotally attached to the transom via the hinge, and the gate is in the closed configuration:

the pair of members of the gate are bordered by the transom; and the cap is located, relative to the gate and the transom, so that the transom prevents removal of the cap from the gate.

10. The apparatus of claim 1, wherein a first infill panel of the plurality of infill panels includes a male end portion having a protrusion and a second infill panel of the plurality of infill panels includes a female end portion having a recess adapted to cooperate with the male end portion of the first infill panel; and wherein, when the channel system receives the plurality of infill panels between the pair of members, the male end portion of the first infill panel contacts the female end portion of the second infill panel such that the first and second infill panels interconnect with each other within the channel system.

11. The apparatus of claim 1, wherein the gate further comprises:

a kickplate attached to the gate and extending between the pair of members adjacent respective second ends of the pair of members opposite the respective first ends of the pair of members, the kick plate having opposing first and second surfaces and a third surface extending between the opposing first and second surfaces, the first surface of the kickplate being coplanar with the respective first surfaces of the pair of members and the second surface of the kickplate being coplanar with the respective second surfaces of the pair of members; and first and second spacing tabs of the plurality of spacing tabs extending along the third surface of the kickplate between the pair of members, the first spacing tab of the kickplate extending flush with the respective first surfaces of the kickplate and the pair of members and between the respective first spacing tabs of the pair of members, the second spacing tab of the kickplate extending entirely offset from the respective second surfaces of the kickplate and the pair of members and between the respecting second spacing tabs of the pair of members such that the first and second spacing tabs of the kickplate are spacing apart along the third surface of the kickplate the distance substantially equal to the maximum depth of each of the plurality of infill panels.

12. A method, comprising:

inserting first and second infill panels into a channel system defined by a gate, the gate comprising:

a pair of members spaced apart and extending parallel to each other, each member including opposing first and second surfaces and a third surface extending between the opposing first and second surfaces, the respective first surfaces of the pair of members being coplanar and the respective second surfaces of the pair of members being coplanar; and a plurality of spacing tabs including first and second spacing tabs extending along the third surface of each of the pair of members, the first spacing tabs extending flush with the respective first surfaces of the pair of members and the second spacing tabs extending entirely offset from the respective first and second surfaces of the pair of members such that the respective first and second spacing tabs are spaced apart along the respective third surfaces a distance substantially equal to a maximum depth of each of the plurality of infill panels;

wherein, after the first and second infill panels are inserted into the channel system defined by the gate, the first and second infill panels are in contact with each other and each extends between and contacts:

the third surface of each respective member of the pair of members; and the first and second spacing tabs extending along the third surface of each respective member of the pair of members;

and attaching a cap to the gate such that:

the cap extends transversely to the direction of extension of the pair of members and traps the first and second infill panels within the channel system such that the first and second infill panels cannot be removed from the gate;

the cap engages respective first ends of the pair of members in the direction of extension of the pair of members; and at least a portion of the cap is located outside of the channel system.

13. The method of claim 12, wherein the gate further comprises anchor tabs attached to the first ends of the pair of members, respectively; and wherein the cap is attached to the gate via the anchor tabs.

14. The method of claim 13, wherein each anchor tab includes at least one opening adapted to receive a fastener; and wherein attaching the cap to the gate comprises extending the fasteners through the cap so that the fasteners are received by respective ones of the openings.

15. The method of claim 12, wherein the gate further comprises:

a pair of additional members extending between the pair of members, each of the additional members extending transversely to the direction of extension of the pair of members.

16. The method of claim 15, wherein the pair of additional members at least partially define a slot through which at least a portion of each of the first and second infill panels passes during the insertion of the first and second infill panels into the channel system.

17. The method of claim 16, wherein the cap completely covers the slot when the cap is attached to the gate.

18. The method of claim 12, further comprising:

attaching the gate to a transom.

19. The method of claim 18, wherein attaching the gate to the transom comprises:

pivotally attaching the gate to the transom, via a hinge, so that:

the hinge is attached to the transom and to one of the pair of members; and the gate is pivotable between a closed configuration and an open configuration.

20. The method of claim 19, wherein, when the gate is in the closed configuration:

the pair of members of the gate are bordered by the transom; and the cap is located, relative to the gate and the transom, so that the transom prevents removal of the cap from the gate.

21. The method of claim 12, wherein inserting the first and second infill panels into the channel system defined by the gate comprises:

sliding the first infill panel into the channel system until the first infill panel abuts a kickplate located at an end portion of the gate opposite the first ends of the pair of members; and sliding the second infill panel into the channel system until the second infill panel abuts the first infill panel.

22. The method of claim 12, further comprising:

inserting an additional infill panel(s) into the channel system until the channel system is filled by the first infill panel, the second infill panel, and the additional infill panel(s); and modifying the last additional infill panel so that, after the last additional infill panel is inserted into the channel system and the channel system is filled by the first infill panel, the second infill panel, and the additional infill panel(s), the last additional infill panel is flush with the respective first ends of the pair of members of the gate.

* * * * *